US010795533B1

(12) United States Patent
Andreou

(10) Patent No.: US 10,795,533 B1
(45) Date of Patent: *Oct. 6, 2020

(54) CONTENT COLLECTION NAVIGATION QUEUE

(71) Applicant: Snap Inc., Santa Monica, CA (US)

(72) Inventor: Jacob Andreou, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,303

(22) Filed: Jun. 4, 2019

Related U.S. Application Data

(63) Continuation of application No. 15/670,628, filed on Aug. 7, 2017, now Pat. No. 10,345,987.

(Continued)

(51) Int. Cl.
| | |
|---|---|
| *G06F 3/048* | (2013.01) |
| *G06F 3/0481* | (2013.01) |
| *H04N 5/445* | (2011.01) |
| *H04N 21/482* | (2011.01) |
| *H04N 21/431* | (2011.01) |
| *G06T 19/00* | (2011.01) |
| *G06F 16/638* | (2019.01) |

(Continued)

(52) U.S. Cl.
CPC ............ *G06F 3/0481* (2013.01); *G06T 19/00* (2013.01); *H04N 5/44543* (2013.01); *H04N 21/4316* (2013.01); *H04N 21/4825* (2013.01); *G06F 16/4387* (2019.01); *G06F 16/639* (2019.01); *H04L 51/10* (2013.01)

(58) Field of Classification Search
None
See application file for complete search history.

(56) References Cited

U.S. PATENT DOCUMENTS 6,038,295 A    3/2000  Mattes
6,980,909 B2  12/2005  Root et al.
(Continued)

FOREIGN PATENT DOCUMENTS

CA    2887596 A1    7/2015

OTHER PUBLICATIONS

Maria Hakansson et al., Designing a Mobile Music Sharing System Based on Emergent Properties, Jan. 1, 2005, IEEE, pp. 129-132 (Year: 2005).*

(Continued)

*Primary Examiner* — Tam T Tran
(74) *Attorney, Agent, or Firm* — Schwegman Lundberg & Woessner, P.A.

(57) ABSTRACT

Systems and methods for communicating and displaying collections of images according to a user-selected queue are described. In some example embodiments, a system aggregates content items organized into collections for display to a user on a device. The system receives a selection from the user of a desired order of collection display, based on the user selecting queue request elements associated with the content collections. In response to receiving a playlist request from the user, the system causes display of the content collections in the order selected by the user. In some example embodiments, the system automatically queues one or more pieces of autoforward content to automatically play after the completion of the queued content.

17 Claims, 14 Drawing Sheets

Related U.S. Application Data

(60) Provisional application No. 62/405,777, filed on Oct. 7, 2016.

(51) Int. Cl.
*G06F 16/438* (2019.01)
*H04L 12/58* (2006.01)

(56) References Cited

U.S. PATENT DOCUMENTS

| | | | |
|---|---|---|---|
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,826,347 | B1 | 9/2014 | Earle |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,489,661 | B2 | 11/2016 | Evans et al. |
| 9,491,134 | B2 | 11/2016 | Rosen et al. |
| 10,345,987 | B1 | 7/2019 | Andreou |
| 10,516,749 | B1 | 12/2019 | Andreou |
| 2007/0180057 | A1* | 8/2007 | McEnroe ............ G11B 27/034 709/218 |
| 2010/0125882 | A1 | 5/2010 | Athias |
| 2010/0146042 | A1 | 6/2010 | Kruhoeffer et al. |
| 2011/0191684 | A1* | 8/2011 | Greenberg ............ G06F 3/01 715/719 |
| 2011/0202598 | A1 | 8/2011 | Evans et al. |
| 2012/0209924 | A1 | 8/2012 | Evans et al. |
| 2014/0040712 | A1 | 1/2014 | Chang et al. |
| 2015/0046811 | A1 | 2/2015 | Higashi et al. |
| 2015/0177954 | A1 | 6/2015 | Wei et al. |
| 2015/0180914 | A1* | 6/2015 | Welinder ............ H04L 65/403 715/758 |
| 2015/0334101 | A1 | 11/2015 | Brüchner et al. |
| 2016/0092576 | A1 | 3/2016 | Quercia et al. |

OTHER PUBLICATIONS

Cesar A. V. Melo et al., Promotion of Content Availability by Playlist Viewers in CDN-P2P Systems, Jun. 1, 2013, IEEE, pp. 2298-2302 (Year: 2013).*

"U.S. Appl. No. 15/670,628, Notice of Allowance dated Feb. 28, 2019", 9 pgs.

Leyden, John, "This SMS will self-destruct in 40 seconds", URL: http://www.theregister.co.uk/2005/12/12/stealthtext/, (Dec. 12, 2005), 1 pg.

Mu, Mu, et al., "Let's Share a Story: Socially Enhanced Multimedia Storytelling", IEEE Computer Society, (Jul.-Sep., 2015), 12 pgs.

Popp, Jens, "Perfect Playlist", IP.COM, (Apr. 14, 2012), 10 pgs.

"U.S. Appl. No. 15/639,252, Examiner Interview Summary filed Aug. 5, 2019", 1 pgs.

"U.S. Appl. No. 15/639,252, Notice of Allowance dated Aug. 21, 2019", 16 pgs.

"Snapchat Gets Its Own Timeline With Snapchat Stories, 24-Hour Photo & Video Tales", [Online]. Retrieved from the Internet: <https://techcrunch.com/2013/10/03/snapchat-gets-its-own-timeline-with-snapchat-stories-24-hour-photo-video-tales/>, (Oct. 3, 2013), 2 pgs.

"Snapchat introduces "Stories", a narrative built with snaps", [Online] Retrieved from the Internet: <https://9to5mac.com/2013/10/03/snapchat-introduces-stories-a-narrative-built-with-snaps/>, (Oct. 3, 2013), 2 pgs.

"Surprise!" [Online]. Retrieved from the Internet: <https://www.snap.com/en-US/news/post/surprise>, (Oct. 3, 2013), 1 pg.

Hamburger, Ellis, "Snapchat's next big thing: 'Stories' that don't just disappear", [Online]. Retrieved from the Internet: <https://www.theverge.com/2013/10/3/4791934/snapchats-next-big-thing-stories-that-dont-just-disappear>, (Oct. 3, 2013), 5 pgs.

Sherrets, D.J., et al., "Idea: Chromecast Your Snapchat Stories and Enable to Select Order of People You Want to Watch Their Stories by Tapping 'Add to Playlist'", Medium, [Online] Retrieved from the Internet: <https://medium.com/dj-sherrets/idea-chromecast-your-snapchat-stories-and-enable-to-select-order-of-people-you-want-to-watch-their-bb920253b5a5>, (Apr. 28, 2016), 4 pgs.

U.S. Appl. No. 15/670,628 U.S. Pat. No. 10/345,987, filed Aug. 7, 2017, Content Collection Navigation Queue.

U.S. Appl. No. 15/639,525 U.S. Pat. No. 10/516,749, filed Jun. 30, 2017, Mobile Device Content Navigation.

* cited by examiner

CONTENT COLLECTION NAVIGATION QUEUE

PRIORITY

This application is a continuation of and claims the benefit of priority of U.S. patent application Ser. No. 15/670,628, filed on Aug. 7, 2017, which claims the benefit of priority of U.S. Provisional Patent Application Ser. No. 62/405,777, filed on Oct. 7, 2016, which are hereby incorporated by reference herein in their entirety

BACKGROUND

Content such as news stories or other collections of live or recent content has traditionally been presented to consumers in a heavily controlled and curated format. Early formats for news presentation included newspapers and magazines. Later formats included broadcast radio and television news. Traditional media and news sources for time-sensitive content are typically heavily associated with corporations or well-known persons who gather and present information about current events and happenings. In the modern Internet era, many such news sources have fragmented, but core aspects of information gathering and presentation often remain associated with professionals gathering and sharing information in a way that is tied to an individual identity. While such practices have been able to support some news structures with valuable analysis, the process for generating stories where select professionals filter information and generate stories is time consuming and introduces significant delay between an event occurring and presentation of information to a news consumer.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
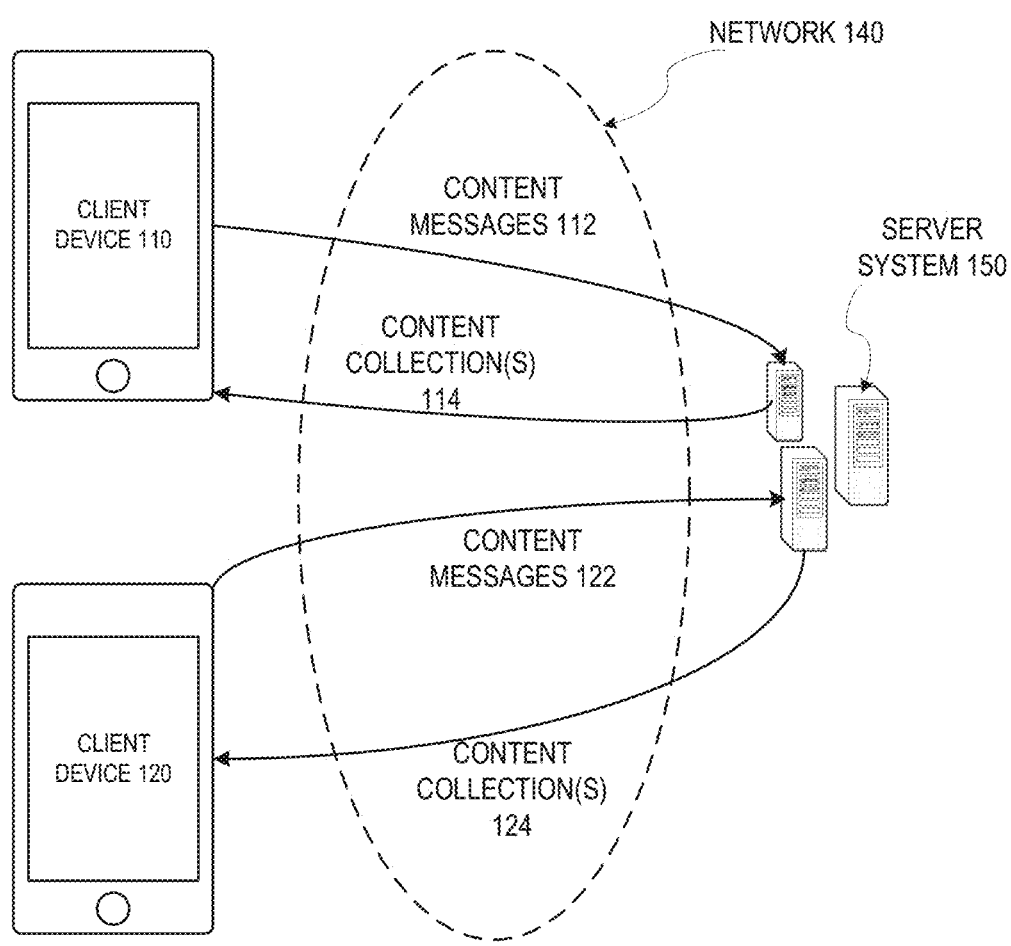
FIG. 1 is a block diagram illustrating a networked system, according to some example embodiments.

Systems and methods described herein relate to a user-initiated aggregation of content collections into a queue, including processes for generating, selecting, and presenting a queue of content to a user. In some embodiments, for example, a device receives a list of available content collections from a server system. A user interface allows for selection of some or all of the content collections. A "play" element of the user interface initiates communication of the selected content collections from the server system to the device for sequential display on the device.

"Content", as described herein, refers to one or more images or video clips captured by an electronic device, as well as any associated metadata descriptions and graphics or animation added to the image or video clip. This includes metadata generated by an electronic device capturing an image or video, as well as metadata that may be associated later by other devices. A "piece of content" refers to an individual image or video clip captured by a client device with any changes made to the image or video clip (e.g., transformations, filters, added text, etc.). Individual pieces of content may have multimedia elements, including drawings, text, animations, emoji, or other such elements added along with image or video clip elements. Content captured by an image sensor of the client device may be sent, along with any added multimedia elements from a user, via a network to other client devices as part of a social sharing network. Individual pieces of content may have time limits or associated display times, which are within a display threshold set by a system. For example, an embodiment system may limit video clips to 10 seconds or less, and may allow users to select display times less than 10 seconds for image content.

A "content message", as referred to herein, is the communication of content between or among two or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections (e.g., stories). In various systems, content messages may be sent from one individual user to another individual user, as, for example, an ephemeral message, or may be sent to a server computer system for inclusion in various content collections.

A "content collection", as described herein, is an ordered set of content. The individual pieces of content that make up a particular content collection may be related in a variety of different ways. For example, in some embodiments, a content collection includes all pieces of content marked as public that are sent to a server system from a particular user within a certain time frame (e.g., within the past 24 hours). Access to such a content collection can be limited to certain other users (e.g., friends) identified by the user who generates the content for the collection. In some other embodiments, content collections include pieces of content from different users that are related by time, location, content, or other metadata. In some embodiments, content collections are referred to as "stories". A story or content collection may be generated from pieces of content that are related in a variety of different ways, as is described in more detail throughout this document.

An "element", as described herein, is an option presented to a user on a user interface, the option selectable by the user. In response to a selection by the user, a communication system initiates a specified action and provides feedback to the user. The presentation of an element may change as a result of a user's interaction with the element, the change showing feedback about an action taken by the communication system. For example, an interaction with a first element by the user causes the communication system to place a content collection associated with the first element in a queue and causes the communication system to change the first element from a photograph display (e.g., a user avatar) to an animated "check" mark.

For example, two user devices may each be associated with accounts, and the accounts may be identified as connected in a communication system. Throughout a given day, one user captures images or video clips (e.g., pieces of content) and sends a content message for each piece of content to the communication system. Some of these pieces of content are identified for inclusion in a semi-private content collection associated with the sending device. Some of the pieces of content are identified as available for public content collections.

Because the two users are connected, the first user is able to access the semi-private content collection associated with the second user account, which contains only pieces of content generated by devices of the second user. When a device of the first user connects to the communication system, the first user's device receives interface information indicating that the second user has a content collection with updated pieces of content. The interface information sent to the first user's device also includes indications for other users' content collections that have been updated, so long as the first user is associated with or otherwise authorized to view the content collections. Additionally, the interface information may include details for content collections that are created from content messages sent from any other system user. These live or location-based content collections may be curated or automatically generated by the communication system.

The first user may further be presented with an option to place messages from a first content collection associated with the second user in a queue. Within the queue, the first content collection is ordered among other content collections based on the sequence of selection of the content collections by the first user. For example, the first user has previously selected an option to place a second content collection associated with a third user in the queue. In this example, the second content collection is placed higher in the queue than the first content collection. In response to the first user selecting an option to play the queue, content within the second content collection is shown prior to content from the first content collection.

Each piece of content is associated with a display time less than a threshold (e.g., 10 seconds or less). When the device reaches the end of the second content collection, the device continues to the first content collection. Similarly, when the device reaches the end of the first content collection, the device plays content from a content collection that was selected by the first user for placement in the queue subsequent to the first content collection. After all content collections from the queue are displayed, public content collections may be selected based on proximity, time, interestingness, or other such metrics. In other embodiments, other user selections or preferences may be used to select a next content collection.

In some example embodiments, the communication system presents an option on the user interface for the first user to view content collections only from users having a certain relationship with the first user. For example, the first user and the second user may be designated as "best friends" within the communication system. The communication system determines whether messaging activity between the second user and the first user exceeds an activity threshold for a time period. If the activity threshold is exceeded, the second user and the first user are designated as "best friends". The first user may later select an option to view only content from users designated as "best friends". In response to this selection, the communication system aggregates a queue of content collections, including content collections associated with the second user.

In some embodiments, the communication system receives sufficient content from enough users that the system may generate and display content collections indefinitely. Additionally, some systems may allow automatic insertion of advertising elements between some or all content collections. Further still, some systems allow a user to jump to a next or previous piece of content or a next or previous content collection in addition to displaying pieces of content and content collections in accordance with a user-selected queue. Some embodiments further allow a user to "select all" content collections available from all connections. In response to such a selection, the communication system causes display of the content collections in a progressive manner that automatically proceeds to the next piece of content and then the next content collection over time. Additional embodiments and details are described below.

FIG. 1 is a block diagram illustrating a networked system 100, according to some example embodiments. The networked system 100 includes a client device 110, a client device 120, a server system 150, and a network 140 that is used to convey communications between the client devices 110 and 120 and the server system 150. The client devices 110 and 120 may be any smartphone, tablet, phablet, laptop computer, network-enabled camera, or other such network-enabled device. The client devices 110, 120 may include a camera device for capturing content, or may be coupled to a separate camera device that is used to capture the content prior to sending it to the other client device 110, 120 for storage. Some embodiments may therefore include wearable devices such as a pendant with an integrated camera that is coupled to a client device 110, 120. Other embodiments may include other associated devices with an integrated camera that may be wearable, such as a watch, eyeglasses, clothing such as a hat or jacket with integrated electronics, a clip-on electronic device, or any other such devices that may communicate or be integrated with a client device 110, 120. The client devices 110 and 120 are connected to the server system 150 via the network 140. The network 140 may include any combination of wired and wireless connections. This may include cellular access networks, access-point interfaces to the Internet, or any other such networks 140 or network elements. For example, the client device 110 may interface with the network 140 using a Long-Term Evolution (LTE) cellular network to communicate with the server system 150, while the client device 120 may use a WI-FI® access point to interface with the network 140 and communicate with the server system 150. The server system 150 may be one or more computing devices as part of a service or network computing system. In certain embodiments, particularly embodiments with large numbers of client devices 110, 120 interfacing with the server system 150 from widely different locations all over the globe, the server system 150 may be a distributed network of server computers that are similarly widely distributed, and which communicate with each other via the network 140. In some embodiments, the client devices 110 and 120, as well as any elements of the server system 150 and the network 140, may be implemented using elements of a software architecture 902 or machine 1000 described in FIGS. 9 and 10.

The networked system 100 may be used in communication of content messages from the client devices 110, 120 to the server system 150, and communication of content collections from the server system 150 to the client devices 110, 120. As shown in FIG. 1, the client device 110 communicates content messages 112 to the server system 150, and the client device 110 receives content collections 114 from the server system 150. In addition to this functionality, used for the embodiments described herein, the client device 110 may additionally receive private pieces of content and communications from other users, and may convey a personal content collection to the server system 150, with the personal content collection including images or video from the content messages 112 generated by the client device 110 or another device coupled to the client device 110. Similarly, the client device 120 sends content messages 122 to the server system 150 and receives content collections 124 from the server system 150, and may additionally perform other actions.

Figure 2A:
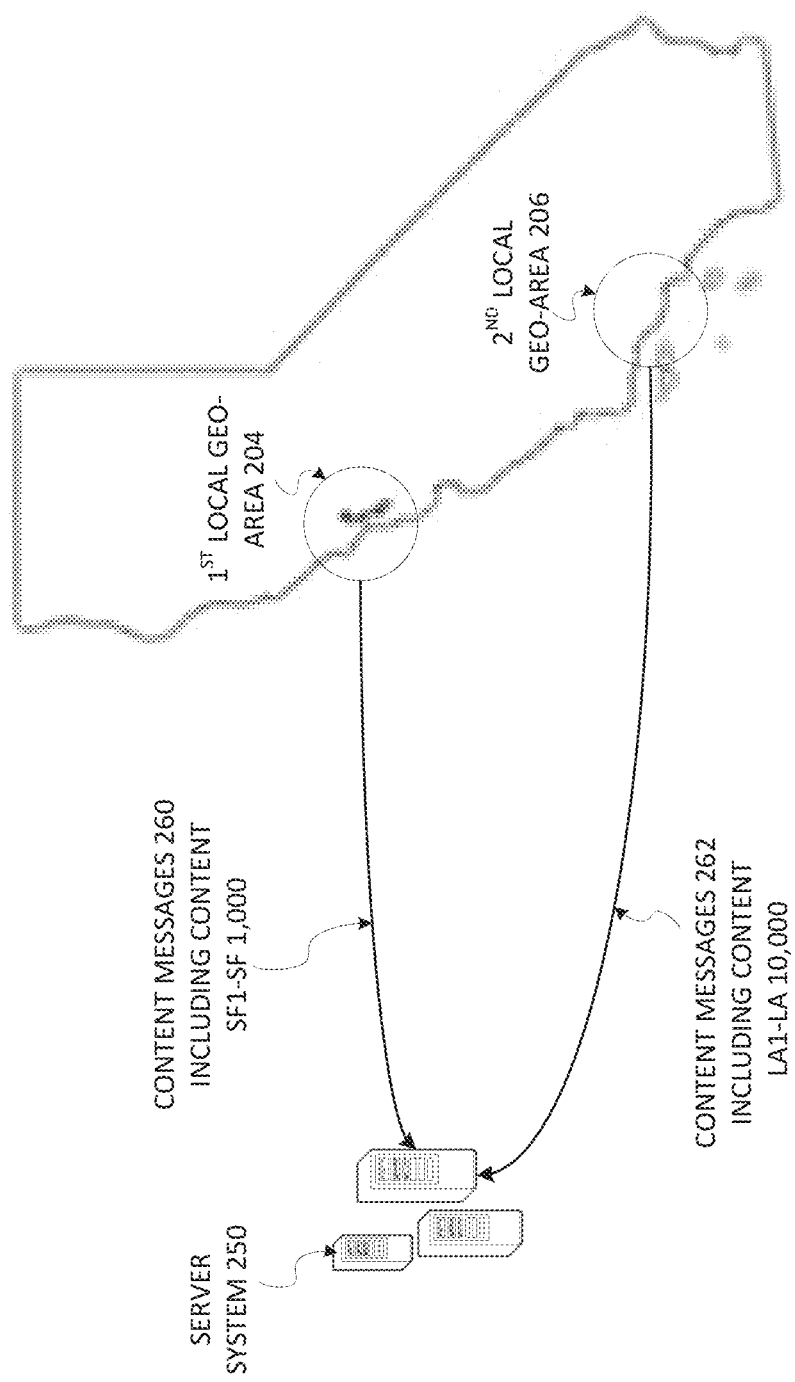
FIG. 2A illustrates aspects of server system operation for receiving content for different geographic areas, in accordance with certain example embodiments.
Figure 2B:
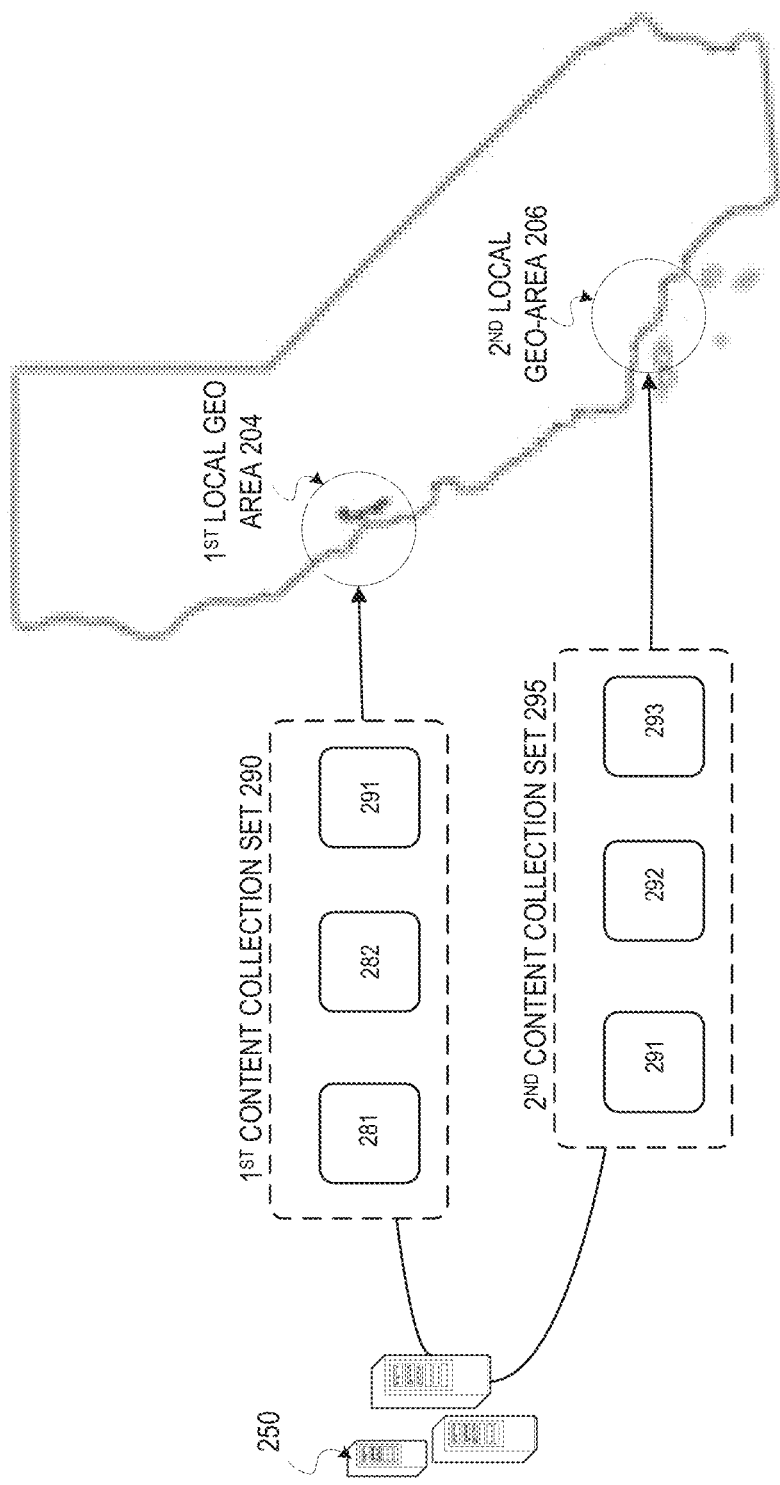
FIG. 2B illustrates aspects of server system operation for distributing different content collections, in accordance with certain example embodiments.

FIG. 2A illustrates aspects of a server system 250 receiving content messages from different geographic areas, in accordance with certain example embodiments. FIG. 2B illustrates aspects of the server system 250 sending different live content collections to different geographic areas, in accordance with certain example embodiments. In contrast to FIG. 1 that shows two client devices 110 and 120. FIGS. 2A and 2B show an abstract of the client side of a system where thousands or millions of client devices 110, 120 in different areas may be interacting with the server system 250.

Instead of individual client devices 110, 120, FIGS. 2A and 2B show a simple user segment representation with two local geographic areas 204 and 206, which are the lowest-tier areas in this example. In certain embodiments, geofences are used to define local areas. Such geofences may be tracked by aspects of the networked system 100, including location systems within client devices such as the client devices 110 and 120, network-based location systems as part of the network 140, separate location systems such as the Global Positioning System (GPS), or any combination of these or other location systems. In various embodiments, the live or public content collections (e.g., a first content collection set 290 or a second content collection set 295) may be made available to a particular device based on the location of the device and a location associated with a particular content collection.

Figure 3A:
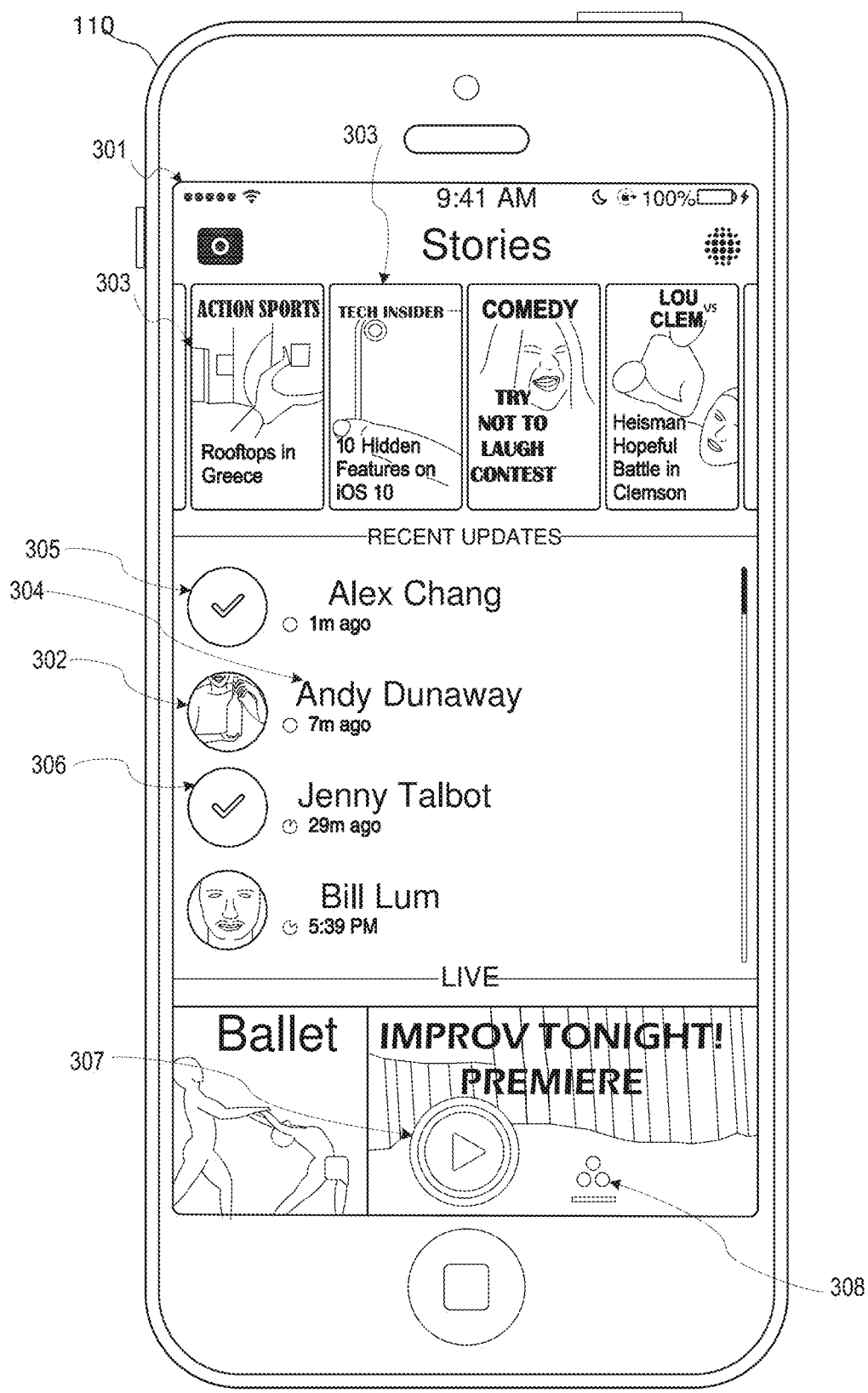
FIG. 3A illustrates an example user interface for a user to queue content collections on a client device, with a first selectable queue request element, a second selectable queue request element, and a queue play element.

In other embodiments, rather than considering set geofences or groups of users, a system may generate content collections for each client device 110, 120 individually. In such an embodiment, whenever a user navigates to a content collection interface within an application operating on a client device 110, 120 (e.g., as illustrated in FIG. 3A), the client device 110, 120 communicates a current location to the server system 250. The location of the client device 110, 120 or other device which provided information at that time can be used to generate a list of content collections for the device.

In the illustrated example of FIG. 2A, the client devices 110, 120 within the first local geographic area 204 are grouped together and communicate 1000 content messages 260 to the server system 250 in a first time period. The content associated with these content messages 260 is shown as SF1 through SF1000. During the same time period, 10,000 content messages 262 containing individual video clips or images are sent to the server system 250 by client devices 110, 120 within the second local geographic area 206, illustrated as content LA1 through LA10000. These are public content communications with content available for communication to any user. The system may additionally include content for content collections limited to "friend" accounts, as well as content sent as a message to a particular user that is to be deleted as an ephemeral message and not shared with any other user than the target recipient. The above volume of public content is sufficient to overwhelm an individual user. Therefore, the server system 250 operates as a curator to filter the content messages 260, 262 and provide a select set of the pictures and videos from the content messages 260, 262 as one or more content collections for the user.

In various embodiments as described below, this curation may be performed by system operators using a curation tool, or may be performed by automatic analysis and selection performed by the communication system. One example embodiment segments users by local area. Content collections for a client device 110, 120 are generated from the most recent content messages 260, 262 that were generated in the client device 110, 120's current local area. Such local content messages 260, 262 for a content collection can further be filtered based on image quality and image content. Image content filtering may be used to prevent excess content duplication, to provide a variety of different content, to provide content identified as newsworthy (e.g., images associated with famous people), or based on any other such content filtering selections. Image content may also be analyzed to identify content duplication, and to avoid placing extremely similar content (e.g., videos of the same event from similar angles) in a single content collection. Additionally, the server system 250 can analyze trends associated with incoming content messages 260, 262 from other local areas to generate content collections based on the trends identified by the system. Additional details related to curation and content collection generation are discussed below with respect to FIG. 5.

FIG. 2B illustrates a first content collection set 290 being made available to all client devices 110, 120 within the first local geographic area 204. Similarly, a second content collection set 295 includes content collections visible to all client devices 110, 120 within the second local geographic area 206. The second content collection set 295 is shown as including three content collections, with all three content collections generated from content messages 260, 262 originating in the second local geographic area 206. These content collections of the second content collection set 295 include LA content collections 291-293. The first content collection set 290 is shown as including two content collections generated from content messages 260, 262 originating within the first local geographic area 204, SF content collection 281 and SF content collection 282. The first content collection set 290 also includes a content collection generated from content messages 260, 262 originating within the second local geographic area 206, the LA content collection 291. As described above, the LA content collection 291 may be identified by the server system 250 analyzing system trends, where a larger than normal number of content collection views, screenshots, incoming additional content messages 260, 262, or other system trends identify the LA content collection 291 as a content collection to be made visible to a larger user segment.

FIG. 3A illustrates an example user interface 301 for a user to queue content collections on the client device 110, with a first selectable queue request element, a second selectable queue request element, and a queue play element. The user interface 301 may, for example, be a graphic user interface presented to a user on the client device 110. Further shown within the user interface 301 are content thumbnails 302 and geo thumbnails 303 that are selectable and linked to various content. In some example embodiments, the content thumbnails 302 are displayed with associated user avatars 304. The user avatar 304 includes identification text of a user (e.g., username) as well as a time indication of when the last content from the user became available. Also shown are a first queue indication 306 and a second queue indication 305. The communication system overlays the queue indications 305 and 306 onto the content thumbnails 302 in response to a user action. Additionally, a playlist indication 307 is shown and may be altered based on one or more content items existing in the queue. One or more selectable elements may be overlaid on the content thumbnails 302, the queue indications 305 and 306, and the user avatar 304. A "select all" toggle 308 is also shown, which provides an element to allow a user to take an action on all elements associated with content thumbnails at once.

In some example embodiments, a first user may engage in various interactions with elements located on the user interface 301. These interactions include selecting various options presented to the first user. A single element may have multiple options included, and the selection of an option by the first user depends on the type of physical interaction the user has with the element (e.g., swipe, tap, long tap, etc.). Some of the options presented to the user include, but are not limited to, selecting a content thumbnail to add content to a queue, deselecting a content thumbnail to remove content from a queue, selecting a single content item or collection of content to play instantly, selecting a toggle to add all available content items to a queue, and selecting a playlist indication to begin playing all content currently in the queue.

In an example, the first user navigates to the user interface 301. In response to the navigation, the communication system aggregates content items available to the first user. The content items are clustered in content collections including a first content collection from a second user, a second content collection from a third user, and a third content collection from a fourth user. The content collections are further represented on the user interface 301 by content thumbnails 302 next to user avatars 304, and the content collections are ordered based on the most recently received content (e.g., the most recently received content is displayed first). The first user takes a first action by tapping a first element overlaid over the content thumbnail 302 associated with the third content collection. In response to the action, the communication system determines that the first user has selected an option to add content within the third content collection from the fourth user into the queue, and further takes action to add all available content from the fourth content collection to the queue. The communication system then provides feedback by changing the content thumbnail associated with the third content collection to a first queue indication 306 and altering the playlist indication 307 to reflect that there is content in the queue.

The first user then takes a second action by tapping a second element over the content thumbnail 302 associated with the first content collection from the second user. As described above, the communication system places content from the first content collection in the queue (but ordered after content from the third content collection) and provides feedback by changing the content thumbnail 302 associated with the first content collection to a second queue indication 305.

The first user then takes a third action by tapping a third element over the content thumbnail 302 associated with the second content collection from the third user. As described above, the communication system places content from the second content collection in the queue (but ordered after content from the third content collection and the first content collection) and provides feedback by changing the content thumbnail 302 associated with the second content collection to a third queue indication.

As shown in the drawing, the first user has taken the first and second actions to generate the first queue indication 306 and second queue indication 305 next to the respective user avatars 304, but has not taken the third action to change the content thumbnail 302 associated with the second content collection into the third queue indication. In some embodiments, the first user can further take action on the geo thumbnails 303 to change these thumbnails into queue indications and place the content collections from the geo thumbnails 303 into the queue based on the order of the actions.

Returning to the example, the first user then takes a fourth action by tapping the second element overlaid over the second queue indication 305. The communication system determines that the first user has selected an option to remove content from the first content collection from the queue and removes any content from the first content collection in the queue. The communication system further changes the display of the second queue indication 305 back to the display of the content thumbnail 302 associated with the first content collection.

Finally, the first user takes a fifth action by tapping a fourth element overlaid over the playlist indication 307. The communication system determines that the first user has selected an option to play all content contained in the queue and causes a display of all content available from the third content collection (since the first user selected this content first) immediately followed by all content from the second content collection. After all content in the queue has completed playing, the communication system returns the first user to the user interface 301.

Further embodiments may also include additional interface functionality. For example, when the first user "swipes" to a different menu, the queue is cleared. Thus, when the first user navigates back to the queue, all queue indications such as 305 and 306 return to a display of content thumbnails such as 302. In addition, the communication system may take various alternative actions in response to the first user's interaction with an element. For example, if the first user selects a content thumbnail associated with content within a content collection that is not already loaded, the communication system displays a "loading" animation until the content within the content collection has completed loading. After loading, the communication system displays a queue indication over the thumbnail to reflect that the content is now available in the queue and accessible using the playlist indication 307. Additional animations may be shown to the first user in response to other user interactions with elements, such as a "play now" animation in response to the first user selecting an option to view a single story, and a "deselection" animation in response to the first user selecting an option to remove a content collection from the queue. The communication system may also cause display of "element selection" animations, to show when an element is currently interacted with by the first user (such as the first user holding down their finger on the element). These embodiments are intended to serve as non-limiting examples of how the communication system receives various user input and presents content.

Figure 3B:
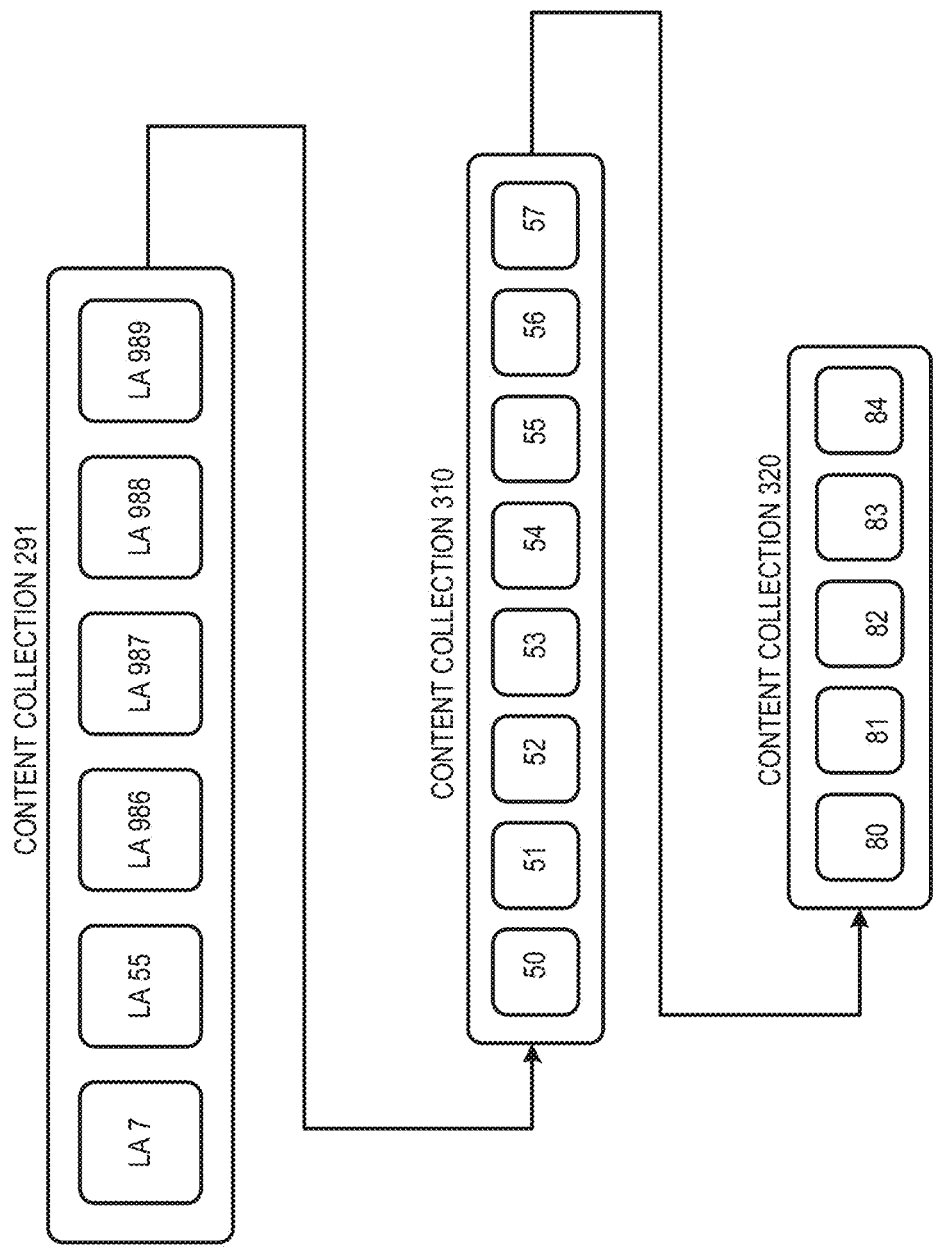
FIG. 3B is a simplified illustration of a sequence of live content items aggregated by the client device. Shown on the illustration are a first content collection, a second content collection, and a third content collection.

FIG. 3B is a simplified illustration of a sequence of live content items aggregated by the client device 110. Shown on the illustration are a first content collection 290 a second content collection 310, and a third content collection 320. The content collections further include content items. For example, when a user selects a portion of a geo thumbnail 303 associated with the first content collection set 290, the individual pieces of content within the collection, shown as pieces of content LA7, LA55, and LA986-989, are displayed in order, based on a live event occurring in Los Angeles. Each piece of content has an associated display time that is below a display threshold time, and each piece of content is presented in order for the associated display time for that piece of content. The content in these content collections may include content within a recent time frame, such as the past 24 hours or one week, or may simply include previously unseen content. In other embodiments, the content may be limited for this account based on "my stories" or account-based content collections in any other way described herein.

Many varieties of applications 910 (also referred to as "apps") can be executing on the machine 1000, such as native applications (e.g., applications programmed in Objective-C, Swift, or another suitable language running on IOS™, or applications 910 programmed in Java running on ANDROID™), mobile web applications (e.g., applications written in Hypertext Markup Language-5 (HTML5)), or hybrid applications (e.g., a native shell application that launches an HTML5 session). For example, the client device 110 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, or biometric monitoring apps). In another example, the client device 110 includes a social messaging app such as SNAPCHAT® that, consistent with some embodiments, allows users to send public content to the server system 250, and to receive content collections from the server system 250. Such a SNAPCHAT® application may additionally enable exchange of private ephemeral image and/or video content messages in addition to communication of content messages 260, 262 for inclusion in stories and receipt of content in the form of content collections for display on the client device 110.

Figure 3C:
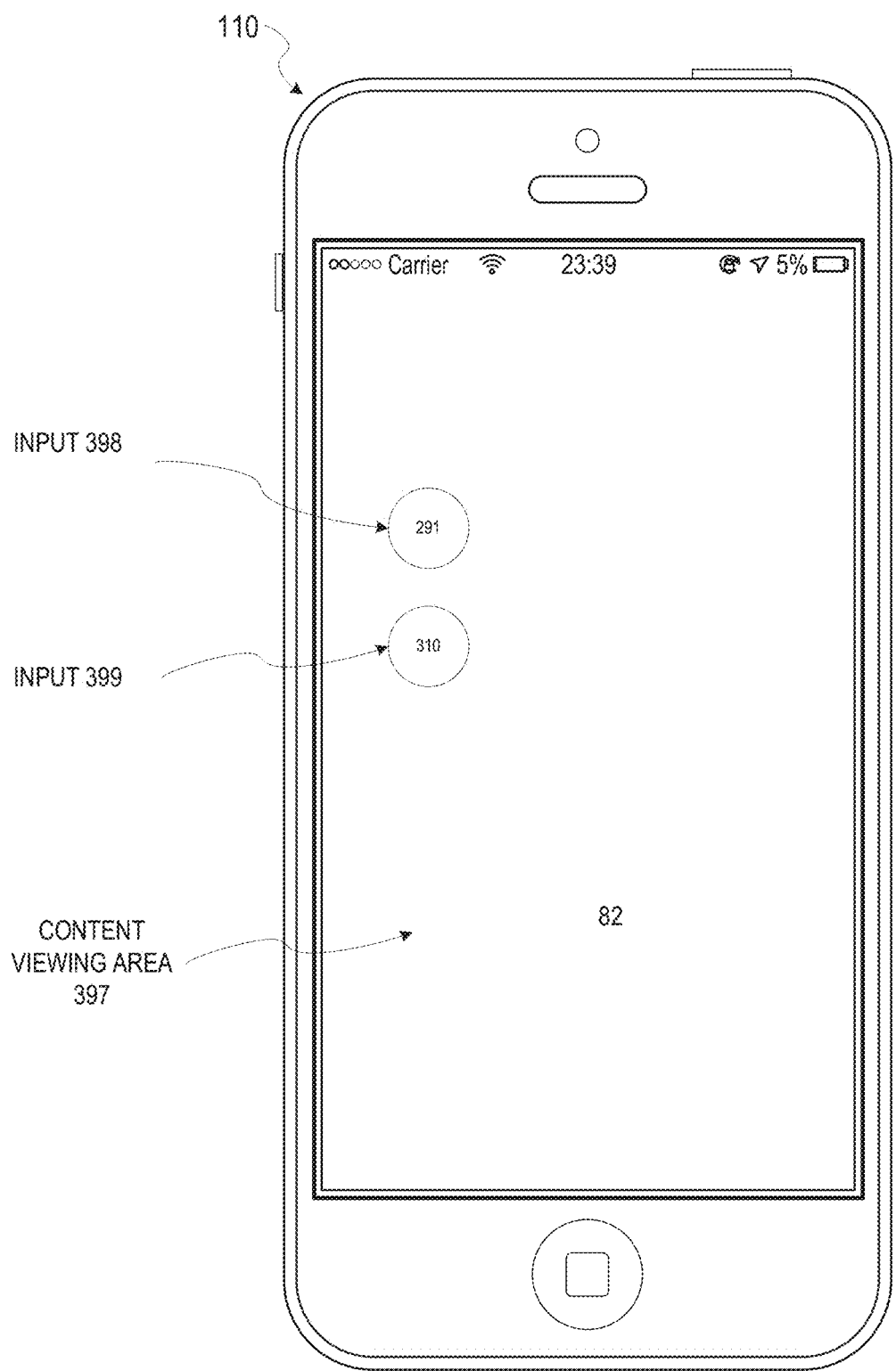
FIG. 3C shows a content viewing area along with inputs, which are selectable areas on a touch screen of the client device.
Figure 3D:
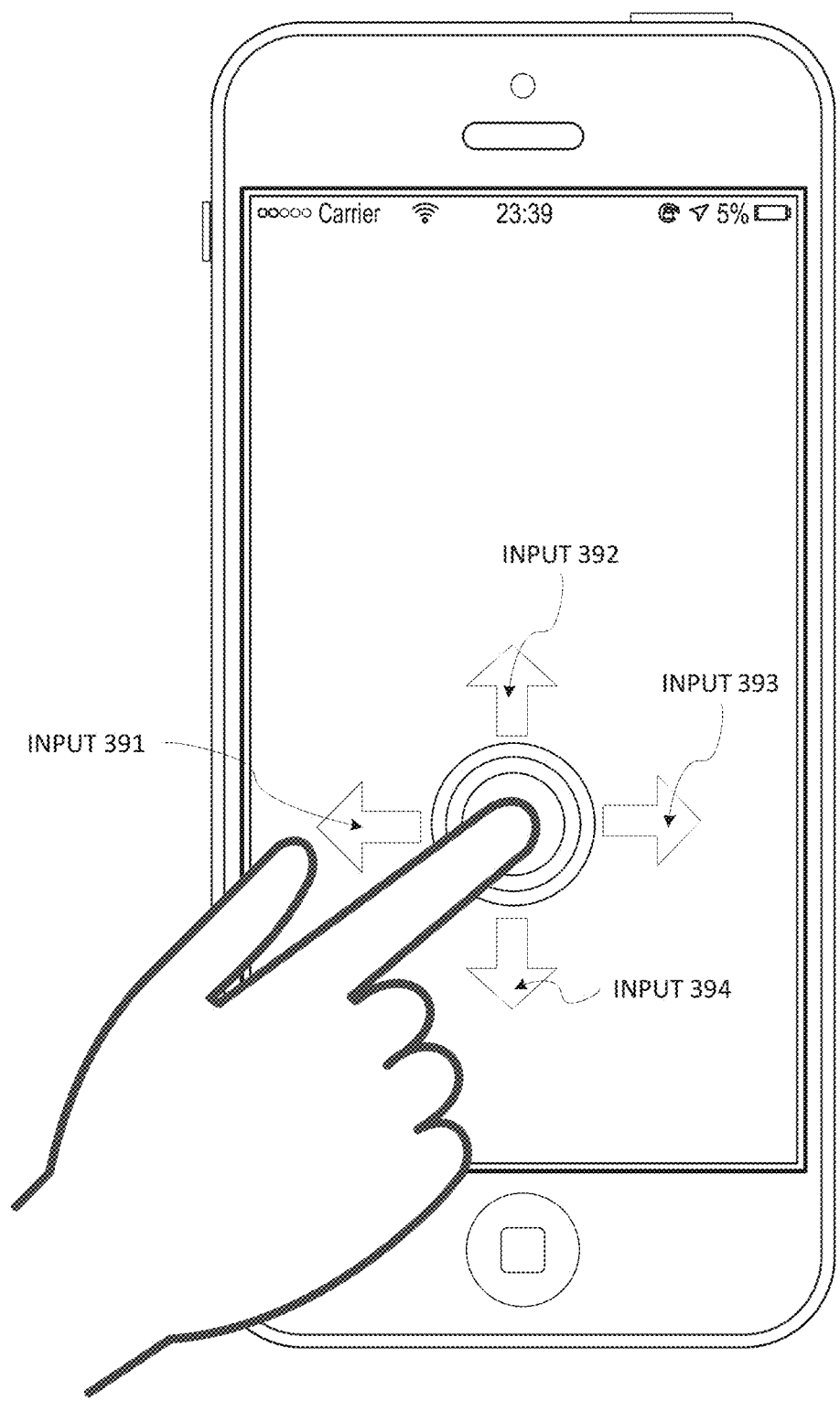
FIG. 3D shows another example embodiment of aspects of user inputs for navigating through content collections.

In some embodiments, applications may implement collection display and autoforwarding as described herein. FIGS. 3C and 3D illustrate embodiments of an interface for viewing content collections such as the content collections shown in FIG. 3B after a touch selection for content collection is made in an interface of the client device 110. In the example shown in FIG. 3B, each piece of content has an associated display time that is below a display threshold time, and each piece of content is presented in order within a content viewing area 397 (FIG. 3C) for the associated display time for that piece of content. In the example of FIG. 3B, the second content collection 310, which has the most recent content updates, is displayed at the top of the content collection list in the section, and is the first automatically selected content collection after the first content collection set 290 selected by a user input finishes displaying. After the first content collection set 290 finishes displaying, each piece of content 50-57 of the second content collection 310 plays in order, and the system automatically selects the next user-based content collection in the list, the third content collection 320. After content pieces 80-84 of the third content collection 320 are displayed, another content collection is selected by the system. If no other content collections presented for selection by a user are left, the client device 110 will receive a public content collection from the server system 250. This content collection can be a collection curated by system operators, or a content collection automatically generated from all content available to the server system 250. As display of a newly received content collection completes, the client device 110 continues receiving new content collections until the user inputs a command to stop presentation of new content.

In some embodiments, additional elements are inserted between the end of one content collection and the beginning of the next content collection. For example, an end-of-collection graphic is presented, in some embodiments, after the piece of content LA989 is displayed for the associated display time and before the piece of content 50 is displayed. In some embodiments, this element is an advertising element, which can include images, text, video, or multiple instances of any such element presented as an advertisement. In other embodiments, such advertising elements are presented between the end of each content collection and the beginning of the next. In some embodiments, such advertising elements are presented between stories after a threshold time period, after a set number of content collections, or based on any combination of such elements. Multiple advertising elements or multiple sets of advertising elements may be presented between content collections on user devices, as described herein. In some embodiments, "sponsored" content collections are content from an advertising account. These sponsored content collections may be periodically selected by a system based on advertising metrics within the system. Such sponsored content collections are, in some embodiments, selected in a fashion similar to the selection of advertising elements discussed above, and can include pieces of content from devices, as well as graphical, video, or image content generated using an advertising tool and submitted to a content database as sponsored content.

Thus, as described herein, a user accesses content collections via an interface of a mobile device. The interface may include information about the available content collections, and may order the content collections based on details of the content in the collections. For example, in one embodiment, a user may have an account associated with a number of other accounts (e.g., friends). Each friend account may have an associated content collection that includes pieces of content sent to the server system 250. In one embodiment, a content collection for each friend account includes pieces of content selected for a personal story and sent to a server computer system within the past 24 hours, with older pieces of content removed from the content collection. Additionally, available content collections, in some embodiments, include content collections associated with public events or locations. Each of these content collections may be presented and ordered in a user interface on a user's mobile device. Further still, "live" content collections may be available, which present curated or automatically generated collections of content filtered from large amounts of content sent to a system.

In embodiments described herein, selection of an individual content collection from a set of presented content collections may then lead to a continuous and ongoing presentation of additional content collections or stories. This continuous presentation occurs as part of an autoforward operation on a mobile device, which displays subsequent content collections after the initial content collection selected by a user has finished displaying.

For example, in one embodiment, a user may select an interface element associated with a first content collection from a first friend. The example content collection can have six pieces of content which are each ten seconds long. After sixty seconds, assuming no further input from the user, the device will autoforward to another content collection. In some embodiments, the selection of a next content collection may be based on a source of the content collection. For example, some embodiments autoforward to the next content collection from a friend account based on which friend account has a story with the most recently added piece of content that has not been seen. After all content collections with previously unseen content have been displayed, content collections from local events may similarly be played automatically in order based on a most recent unseen update. After all local content collections with unseen pieces of content have been displayed, other collections of content are automatically displayed based on system settings. The content collections may be selected based on distance, time, interest, user preferences, or any other such system information. In a system that receives sufficient numbers of content messages 260, 262 that are available for stories, a mobile device can continue autoforwarding to present additional stories indefinitely, with time, location, quality, interestingness, or other filtering factors relaxed as needed to provide additional content collections.

Additionally, in some embodiments, an advertisement or other segmenting element may be displayed between some or all content collections. For example, in one embodiment, following display of the final piece of content for each content collection, a standard end-of-collection graphic may be displayed for a set period of time. In other embodiments, one or more advertisement images or video clips (e.g., advertisement elements) are displayed for a set period of time before autoforwarding to display of the next content collection. In some embodiments, both the end-of-collection graphic and advertisement elements are used.

As described above, then, a system can receive content messages 260, 262 from a wide variety of users, and use pieces of content from these messages to generate different types of content collections or stories. A user can access these stories via a device, and the system is able to autoforward through an ongoing sequence of content collections, with a next content collection selected in a variety of different ways. In some embodiments, in addition to automatically presenting content collections for a pre-selected time, a user interface allows a user to navigate through pieces of content within a content collection and between different content collections.

FIG. 3C shows the content viewing area 397 along with an input 398 and an input 399, which are selectable areas on a touch screen of the client device 110. In the interface illustrated by FIG. 3C, the content viewing area 397 is displaying a content piece 82 from the third content collection 320. The content collections 291 and 310 have been previously viewed. The input 398 provides a selectable interface element to return to displaying the content of the first content collection set 290, and the input 399 provides a selectable interface element to return to displaying the content of the second content collection 310. As the system autoforwards to presenting content from a next content collection, interface information for the previously viewed content collections can be moved to the inputs 398, 399. In one embodiment, for example, after the third content collection 320 is finished, the input 399 will show interface information for the third content collection 320, the interface information for the second content collection 310 will move to the area for the input 398, and the first content collection set 290 will no longer have a user-selectable interface element for jumping directly to the content of this content collection.

FIG. 3D shows another example embodiment of aspects of user inputs for navigating through content collections. In the embodiment of FIG. 3D, tapping on a right side of a touch screen display advances to a next piece of content before the content display period ends. Tapping on a left side of the display causes the piece of content displayed just prior to the piece of content currently being displayed to be displayed again. Such tapping may thus allow a user to navigate forward and backward through individual pieces of content. Similarly, swiping from left to right as an input 393 may move to the first piece of content of a content collection presented just prior to a current content collection, and swiping right to left as an input 391 may cause the beginning of a next content collection to begin displaying. As a piece of content displays after a user navigation input, the display time for each piece of content is used to automatically advance between pieces of content, and then to a new content collection after a final piece of content is displayed. Swiping up as an input 392 may return to the content collection selection interface of FIG. 3A, and swiping down as an input 394 may provide a navigation interface to view similar pieces of content or receive additional details related to a current piece of content or element displayed within the content viewing area 397.

Figure 4:
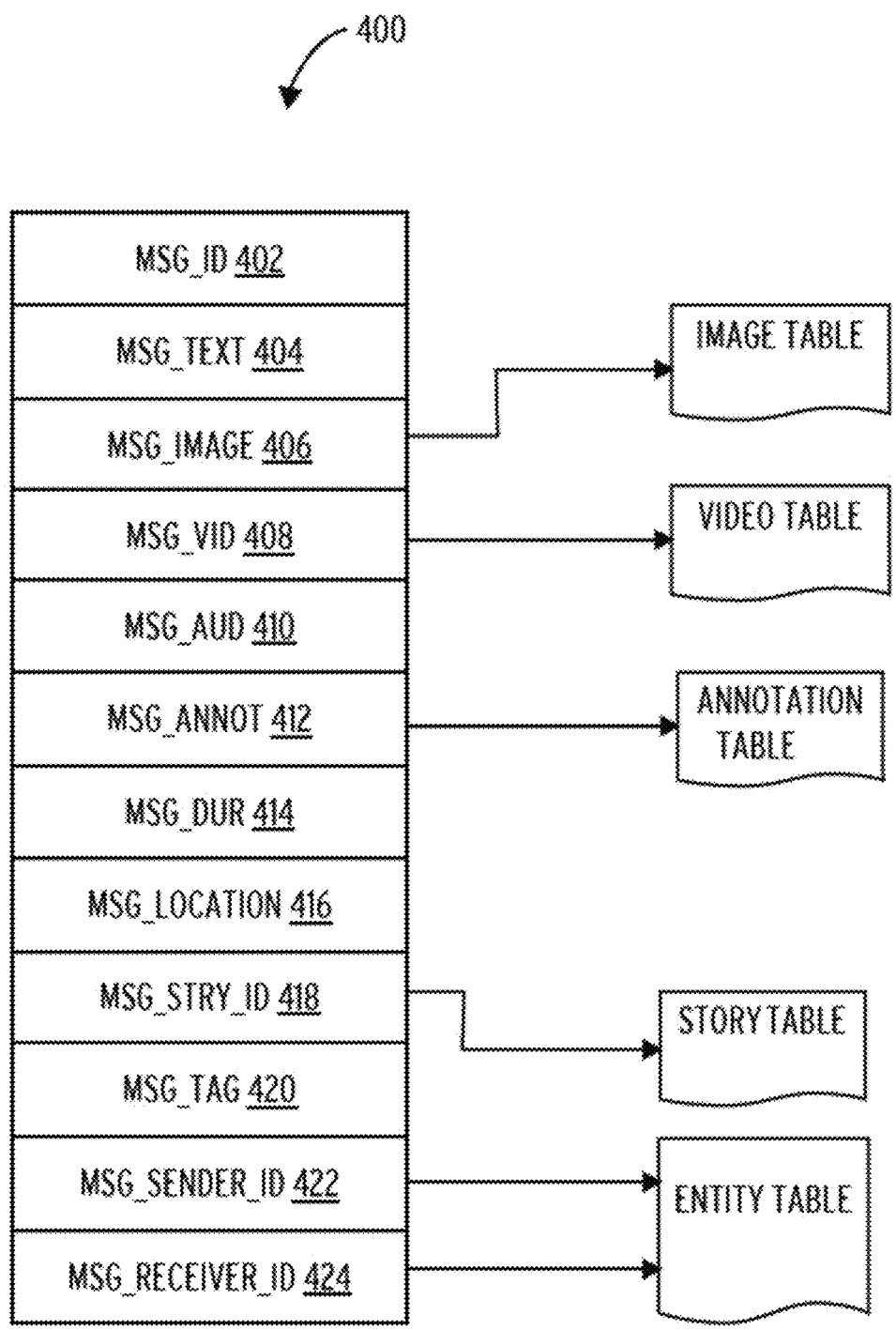
FIG. 4 describes an example of a content message that is used to send content to a server computer system from a client device.

FIG. 4 describes one example of a content message 260, 262 that is used, in some embodiments, to send content to a server computer system from a client device 110, such as the communication of content messages 112 to the server system 150 from the client device 110. In some embodiments, the content of a particular message 400 is used to populate the message table stored within a database, accessible by the server computer system. Similarly, the content of the message 400 is stored in memory as "in-transit" or "in-flight" data of the client device 110 or the server computer system. The message 400 is shown to include the following components:

A message identifier 402: a unique identifier that identifies the message 400.

A message text payload 404: text, to be generated by a user via a user interface of the client device 110, and that is included in the message 400.

A message image payload 406: image data, captured by a camera component of a client device 110 or retrieved from memory of a client device 110, and that is included in the message 400.

A message video payload 408: video data captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, or message audio payload 410) is to be presented or made accessible to a user via a messaging client application operating on any device described herein.

A message geolocation parameter 416: geolocation data (e.g., latitudinal and longitudinal coordinates) associated with the content payload of the message. Multiple message geolocation parameter 416 values may be included in the payload, each of these parameter values being associated with content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: a tag indicative of the subject matter. Each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition. Tag values may additionally be used to identify whether content from a message is to be included in a content collection associated with an account for the sending client device 110 with other content from that account. Tag values may also identify that content of a message is available for public dissemination, including inclusion in public content collections with content from devices associated with other accounts.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table. Similarly, values within the message video payload 408 may point to data stored within a video table, values stored within the message annotations 412 may point to data stored in an annotation table, values stored within the message story identifier 418 may point to data stored in a story table, and values stored within the message sender identifier 422 and the message receiver identifier 424 may point to user records stored within an entity table. In some embodiments, the message receiver identifier 424 may be used to associate content of a message with a particular content collection or to make the content available for curated stories. For example, one message receiver identifier 424 may be associated with the user's personal content collection that is only available for viewing by friends. Another message receiver identifier 424 may be for a pool of content presented to a system curator that generates public content collections using submitted content messages 260, 262.

Data from such content messages 260, 262 as well as other sources (e.g., curation tools, advertisement tools, etc.) is, in some embodiments, stored in a database of a server computer system. While the content of the database is discussed as a number of tables, it will be appreciated that the data could be stored in other types of data structures (e.g., as an object-oriented database).

One example database includes message data stored within a message table. The entity table stores entity data, including an entity graph. Entities for which records are maintained within the entity table may include individuals, corporate entities, organizations, objects, places, events, etc. Regardless of type, any entity regarding which the server system 250 stores data may be a recognized entity. Each entity is provided with a unique identifier, as well as an entity type identifier.

The entity graph furthermore stores information regarding relationships and associations between or among entities. Such relationships may be social, professional (e.g., based on working at a common corporation or organization), interest-based, or activity-based, merely for example. These relationships may, for example, provide access to semi-private content collections, such that a user device is sent interface information for a content collection and allowed to select and view the associated content of another user if a relationship is established between the users.

The database, in some embodiments, also stores annotation data, in the example form of filters, in an annotation table. Filters for which data is stored within the annotation table are associated with and applied to videos (for which data is stored in a video table) and/or images (for which data is stored in an image table). Filters, in one example, are overlays that are displayed as overlaid on an image or video during presentation to a recipient user. Filters may be of various types, including user-selected filters from a gallery of filters presented to a sending user by the messaging client application when the sending user is composing a message. Other types of filters include geolocation filters (also known as geo-filters) which may be presented to a sending user based on geographic location. For example, geolocation filters specific to a neighborhood or special location may be presented within a user interface by the messaging client application, based on geolocation information determined by a GPS unit of the client device 110. Another type of filter is a data filter, which may be selectively presented to a sending user by the messaging client application, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the image table is so-called "lens" data. A "lens" may be a real-time special effect and sound that may be added to an image or a video.

As mentioned above, the video table stores video data which, in one embodiment, is associated with messages for which records are maintained within the message table. Similarly, the image table stores image data associated with messages for which message data is stored in the entity table. The entity table may associate various annotations from the annotation table with various images and videos stored in the image table and the video table.

A content collection table stores data regarding collections of messages and associated image, video, or audio data, which are compiled into a collection (e.g., a SNAPCHAT® story or a gallery). The creation of a particular collection may be initiated by a particular user (e.g., each user for whom a record is maintained in the entity table). A user may create a "personal story" or content collection in the form of a collection of content that has been created and sent/broadcast by that user. To this end, the user interface of the messaging client application may include an icon that is user-selectable to enable a sending user to add specific content to his or her personal story.

A collection may also constitute a "live story", which is a collection of content from multiple users that is created manually, automatically, or using a combination of manual and automatic techniques. For example, such a live content collection may constitute a curated set of user-submitted content from various locations and events. Users whose client devices 110 have location services enabled and are at a common event location at a particular time may, for example, be presented with an option, via a user interface of the messaging client application, to contribute content to a particular live story. The live story may be identified to the user by the messaging client application, based on his or her location. The end result is a "live story" told from a community perspective.

A further type of content collection is known as a "location story", which enables a user whose client device 110 is located within a specific geographic location (e.g., on a college or university campus) to contribute to a particular collection. In some embodiments, a contribution to a location story may use a second degree of authentication to verify that the user belongs to a specific organization or other entity (e.g., is a student on the university campus). In various other embodiments, other types of content collections may be identified and structured within a database using system operator curation tools or automatic computer-based analysis, as described herein.

Figure 5:
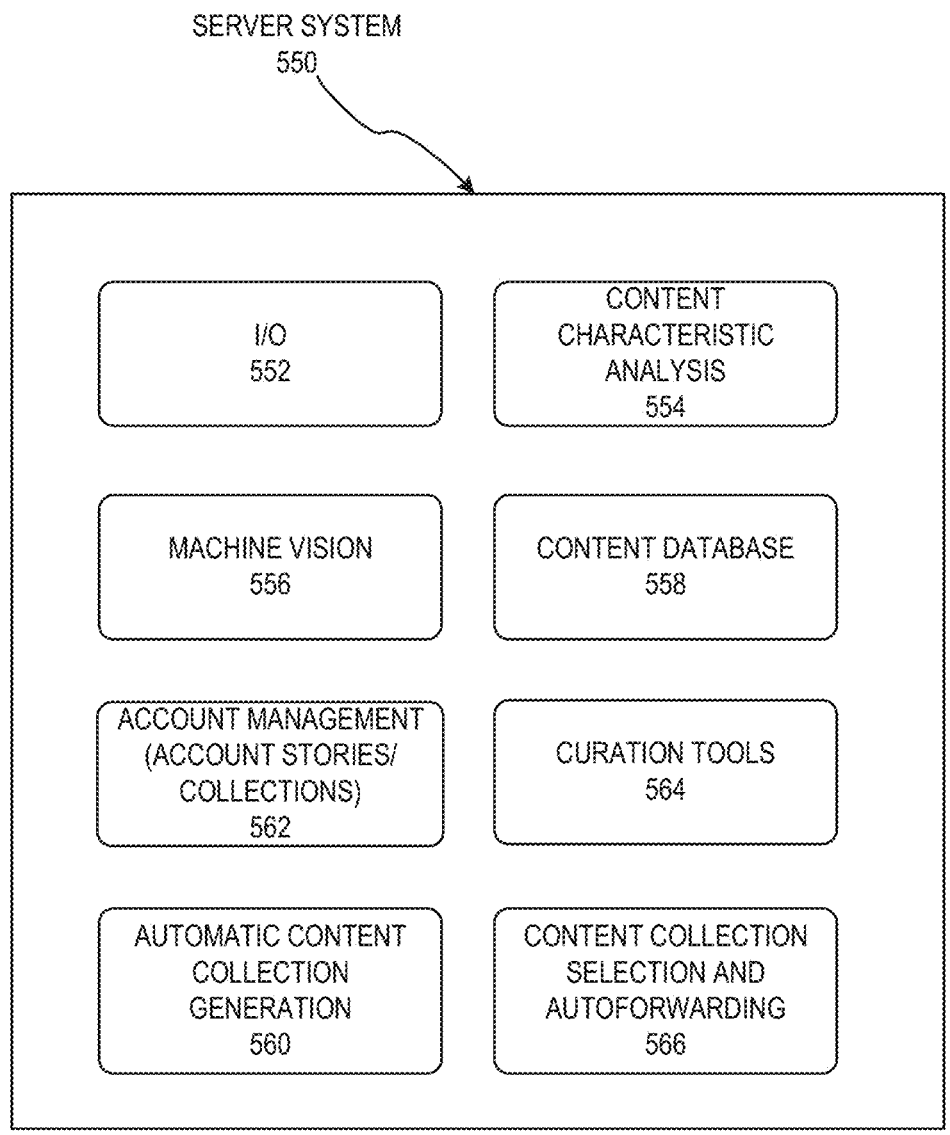
FIG. 5 illustrates aspects of a server system for automatic content collection in a user-initiated queue, according to some example embodiments.

FIG. 5 illustrates aspects of a server system 550 for automatic content collection in a user-initiated queue, according to some example embodiments. In various embodiments, the server system 550 may be used as an implementation of the server system 150 or the server system 250. The example server system 550 includes an input and output (I/O) module 552, a content characteristic analysis module 554, a machine vision module 556, a content database 558, an account management module 562, an automatic content collection generation module 560, curation tools 564, and a content collection selection and autoforwarding module 566.

The I/O module 552 may include any hardware, firmware, or software elements needed to send and receive content and content collections to and from client devices 110, 120 via the network 140. The content characteristic analysis module 554 may include devices, processors, and software to analyze images from pictures and frames of video clips, and then determine content characteristics, including details about when and where a picture or video was generated. In certain embodiments, the content characteristic analysis module 554 may be implemented as a plurality of different modules, each analyzing a different content characteristic, including any content characteristic described herein.

The machine vision module 556 may be used to identify content characteristics based on the content of an image or images in a video. The machine vision module 556 includes hardware, firmware, and/or software for analyzing and understanding content. In one embodiment, the machine vision module 556 is associated with a dictionary comprising image and video content values. Objects identified in images of a piece of content and the arrangement of the identified objects therein may be used by the machine vision module 556, in such an embodiment, to select one or more content values from the dictionary as content characteristics. For example, a simple such machine vision module 556 may identify a ball in an image, and select the values "ball" and "game" as content characteristics. A more complex machine vision module 556 may identify the type of ball as a basketball, and include "basketball" as a characteristic value. A still more complex machine vision module 556 may identify a basketball, a crowd, a court color, and an elevated perspective of the court to identify "professional basketball game" and "basketball arena" as content values for the content. The same complex machine vision module 556 may identify a basketball, a park background, and a concrete court surface and select "amateur basketball game" and "playground basketball" as content values for the content.

These content values generated by the machine vision module 556 can then be stored in the content database 558 along with other characteristic values. Such characteristic values can include one or more content values (e.g., an identification of what is in the content), a generation time, a generation time period, a generation location, a generation area, one or more quality values, any metadata value associated with content, an identifier for a particular piece of content, or any other such values. In some embodiments, a copy of content may be stored in the content database 558 with location information, capture time information, and any other such information about a piece of content. In certain embodiments, the content database 558 may anonymously store details about content use. For example, the client devices 110, 120 can communicate details about presentation of the content on screens of the devices, and about screenshots taken of the content. Anonymous metrics about how often a piece of content is viewed as part of a content collection, how long the content is viewed for, and how frequently screenshots are taken may then be measured by the server system 550, as part of analysis by the content characteristic analysis module 554, with the resulting data stored in the content database 558. In some embodiments, the content database 558 may include this content information with any content or content message information discussed above with respect to FIG. 4 or in any database or table structure discussed above.

The account management module 562 includes application or interface functionality to enable users to manage entity/account relationships via communications between user devices and the server system 550. The account management module 562 may also manage an individual user's content collections, as described herein.

The curation tools 564 include tools available to system operators or advertisers to generate and present content collections from large amounts of content received at the server system 550 and made available by user selection to be included in public content collections (e.g., live content collections, location content collections, content-based content collections, etc.). Similarly, the automatic content collection generation module 560 may filter through large numbers of received pieces of content to generate content collections grouped by location, time, or topic, or on any other such basis. In some embodiments, elements of the automatic content collection generation module 560 are used to filter the number of pieces of content provided to the curation tools 564 to a smaller number (e.g., filtering 10,000 received pieces of content to provide 500 pieces of content to the curation tools 564 for review by system operators).

In some embodiments, the automatic content collection generation module 560 may then use information about pieces of content from the content database 558 to select particular pictures or videos for an automatically generated content collection. In various embodiments, the automatic content collection generation module 560 may use complex scoring, weighting, and other rules in generating a content collection. For example, certain embodiments may function such that all pieces of content meet a quality threshold unless a trend having certain threshold characteristics is identified and all content associated with the trend is below the quality threshold. Another embodiment may weight content collection generation based on a number of content collections currently available in a local geographic area 204, 206. In still further embodiments, any number of complex rules may be applied together as part of content collection generation to filter images and videos for a content collection based on time, location, content, and quality.

The content collection selection and autoforwarding module 566 is used to select one or more next content collections to be sent to a client device 110 following selection of an initial content collection for display on the client device 110 and after an autoforward message requesting input or selection of a next content collection is received. In some example embodiments, a user selects one or more content collections from a user interface and in a desired viewing order. For example, the user may select elements on a user interface by applying a first queue request to a first content collection and a second queue request to a second content collection. In some example embodiments, the content collection selection and autoforwarding module 566 provides functionality to receive these queue requests, place the content in the respective order, and cause presentation of the content accordingly.

In some embodiments, initial sets of content collections are cached on a client device 110, and the automatic content collection generation module 560 only interacts with the client device 110 after the locally cached content collections are presented. In other embodiments, different sets of rules are applied to different sets of content collections. For example, the content collection selection and autoforwarding module 566 may apply a most-recent-update order to selecting a next-entity relationship for content collections, and user-based interest scoring to a selection order for the content collections. In other embodiments, other sets of selection rules are applied to determine which content collection will be selected as an automatically displayed (e.g., autoforwarded) next content collection for a device. The content collection selection and autoforwarding module 566, in some embodiments, also manages communication of elements to be displayed between content collections, including advertising elements or end-of-collection graphics.

In some embodiments, quality scoring within the automatic content collection generation module 560 and/or the content collection selection and autoforwarding module 566 may be used to filter or select pieces of content for a particular content collection and to filter different content collections for presentation to a user. A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such manner. For a video where multiple sample frames are analyzed, an average of scores for each frame may be used to select a score, a worst score for an individual frame of all the analyzed frames may be used, or any such combination or function of multiple scores or selections of scores may be used.

In some embodiments, motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shakiness above the threshold. In other embodiments, a shakiness or motion score may simply modify an overall quality score. In other embodiments, both a hard threshold and an input to an overall quality score may be used.

In some embodiments, images or sample video frames may be analyzed for compression artifacts or other image-processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video-based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low-quality or malfunctioning camera sensor, low-quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio-based information may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used for a quality score or a quality threshold flag, in some embodiments.

In addition to quality scores based on image quality, some scores may be based on image content. For example, as mentioned above, image processing may be used to identify objectionable content such as nudity or taboo language within an image or video clip. In some embodiments, an example orientation (e.g., landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score.

Feedback or machine learning is used, in certain embodiments, to select or set a quality score. Such systems may use neural networks to extract features identified as interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image-quality features and image-content features. In some embodiments, learnable filters may be selected and automatically updated based on a database of images from image-processing services used for content analysis of images or video frames. In other embodiments, any other such sources may be used for learnable filters. Such analysis may be applied both to image elements of content and to audio elements of videos.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality score, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night. Further, aggregated interest and quality scores for complete sets of content collections (e.g., balanced or weighted scoring for pieces of content within a content collection) are used to sort and select content collections for presentation to a user.

Figure 6:
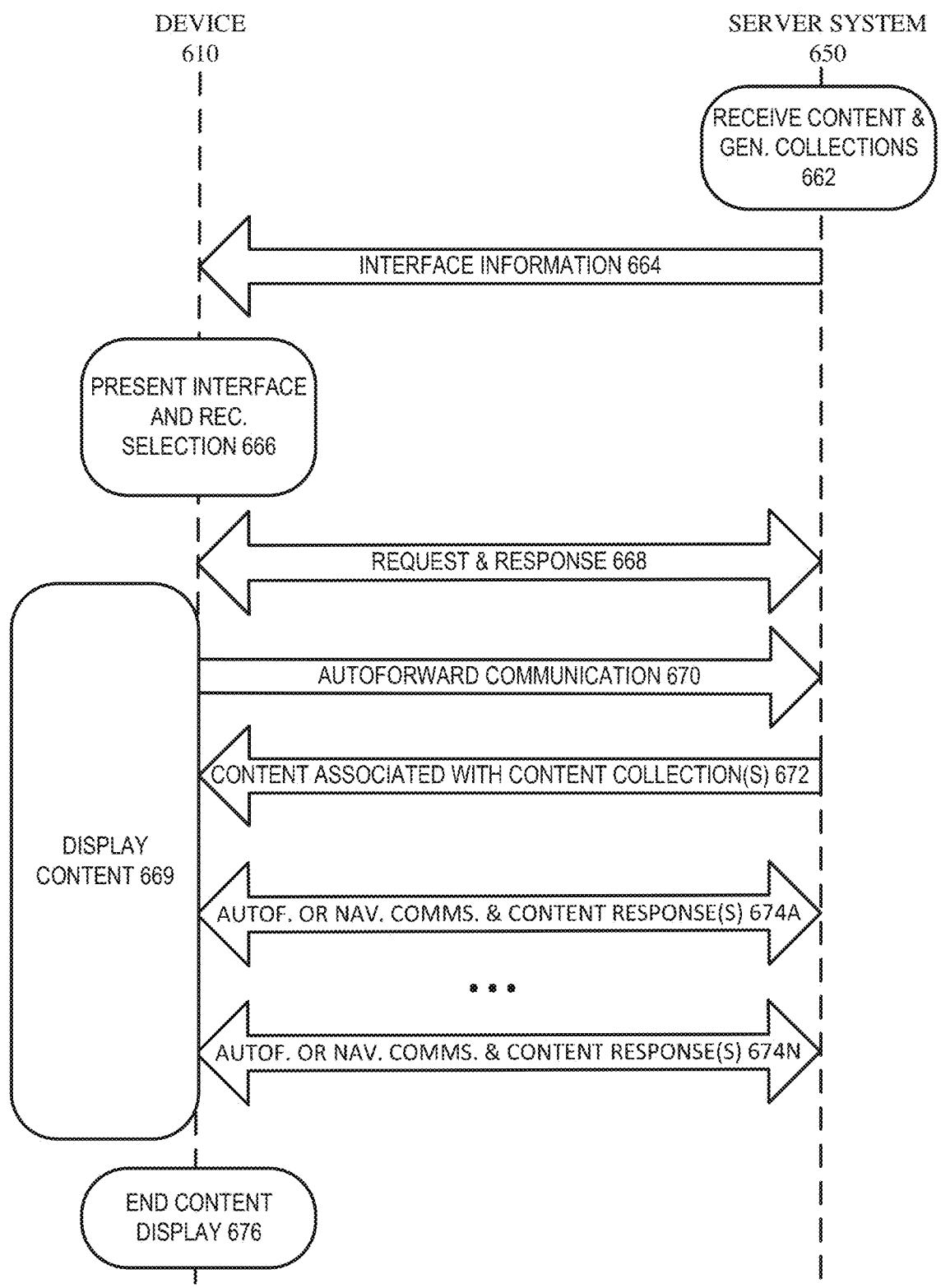
FIG. 6 illustrates aspects of one embodiment of system operation for autoforwarding presentation of content collections.

FIG. 6 illustrates aspects of one embodiment of system operation for autoforwarding presentation of content collections as part of communications between a user device 610 and a server system 650. In the example embodiment of FIG. 6, the server system 650 receives and stores content in operation 662. As discussed above, this content is received from a variety of different devices. The server system 650 processes the content to generate content collections. Based on various factors discussed above, such as entity or account relationships, location, system use history, or other factors which may be used in different embodiments, the server system 650 selects certain content collections to be made available to a user of the user device 610 (e.g., via an interface such as that shown in FIG. 3A). Interface information, which may include details of collection updates and image frames of content from a collection, are sent to the user device 610 in operation 664. The user device 610 then presents an interface including interface information from operation 664, and receives a user's selection of a content collection in operation 666. In the example of FIG. 6, the user device 610 sends a resulting request for the selected content (e.g., a story request) and receives the content in response. In various other embodiments, some or all content of one or more content collections may be cached at the user device 610. In the embodiment of FIG. 6, the server system 650 sends content of the selected collection in response to the user selection of operation 666 and as a response to the story request in operation 668.

The user device 610 then begins displaying content of the content collection in operation 669. When display of a first content collection is complete or expected (e.g., within a threshold time of the end of a final piece of content or based on some other content collection ending trigger), the user device 610 sends an autoforward communication to the server system 650 requesting additional content in operation 670, and receives content from a next content collection in operation 672. In embodiments with caching, the initial autoforward communication may occur based on a trigger associated with an end of the cached content. Operations 674A-N then proceed with the user device 610 requesting additional content based on either autoforward operation or user navigation inputs. For example, if a user is near the end of a content collection, and inputs a "next content collection" command (e.g., the input 391), a request is sent, in some embodiments, from the user device 610 to the server system 650 and content for a next content collection is sent in return. The user device 610 continues to display content at operation 669 until an input is received at the user device 610 to end content display as part of operation 676.

Figure 7:
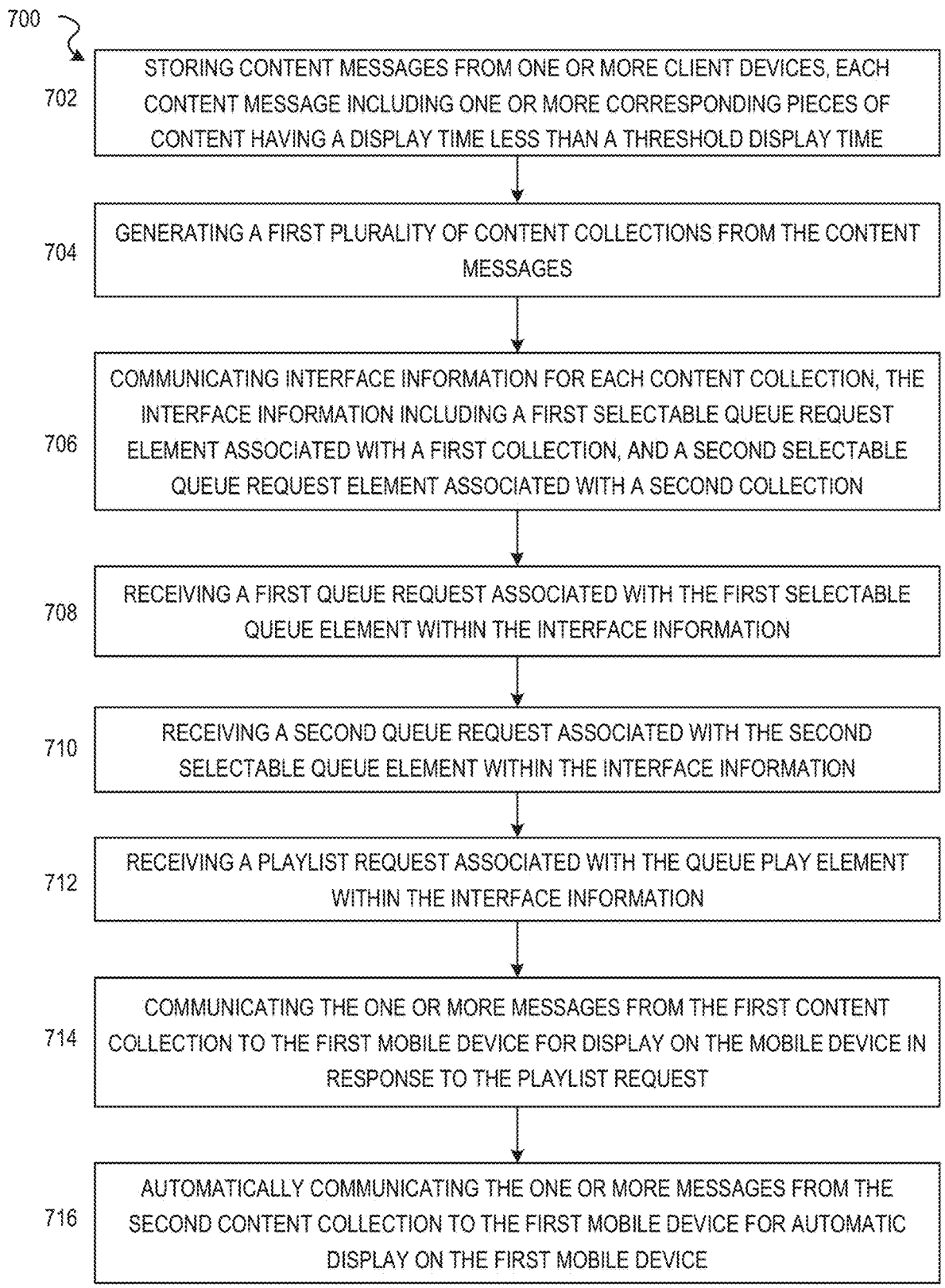
FIG. 7 illustrates a method, according to some embodiments, for aggregating content items into a queue based on a user interaction.

FIG. 7 is a flowchart that illustrates a method 700, according to some embodiments, for aggregating content items into a queue based on a user interaction. In some embodiments, the method 700 may be performed by a server computer system or server system such as the server systems 150, 250. In other embodiments, the method 700 may be implemented as computer-readable instructions that, when executed by processors of a computer, cause the computer to perform the method 700. Various embodiments may be implemented in any fashion described herein. Additionally, it will be apparent that certain operations may be repeated or reordered, or other operations may be performed between the described operations, while still functioning in accordance with the user-initiated content aggregation embodiments described herein.

Operation 702 is for storing content messages from one or more client devices, with each content message including one or more corresponding pieces of content. In some embodiments, the content messages further have a display time that is less than a threshold display time. For example, a client device 110 of a user may receive content from various other client devices of other users, including semi-private content, public content, and live content. This can be accomplished via one or more of the modules discussed herein, including the automatic content collection generation module 560. From operation 702, the method 700 flows to operation 704, where the server generates one or more content collections from the content messages. For example, the automatic content collection generation module 560 can group the content messages by the user submitting each message and further group them chronologically.

From operation 704, the method 700 flows to operation 706, where the system communicates interface information, including a first and a second selectable queue request elements, to the user. For example, the automatic content collection generation module 560 may cause a user interface, such as the user interface 301, to have content collections with selectable queue request elements. From operation 706, the method 700 flows to operations 708 and 710, where the system receives a first queue request associated with the first selectable queue element within the interface information and a second queue request associated with the second selectable queue element within the interface information. In an example, a user interacting with the user interface 301 selects a selectable element overlaying an indication for a semi-private content collection and a selectable element overlaying an indication for a live collection.

From operations 708 and 710, the method 700 flows to operation 712, where the server receives a playlist request from the user. In an example, after selecting one or more content collections using selectable elements, the user selects a playlist indication 307 to initiate content playback in the selected order. From operation 712, the method 700 flows to operations 714 and 716, where the server automatically transmits the messages from the first content collection selected by the user to be displayed on the client device 110 and then automatically transmits the messages from the second content collection to be subsequently displayed on the client device 110.

Figure 8:
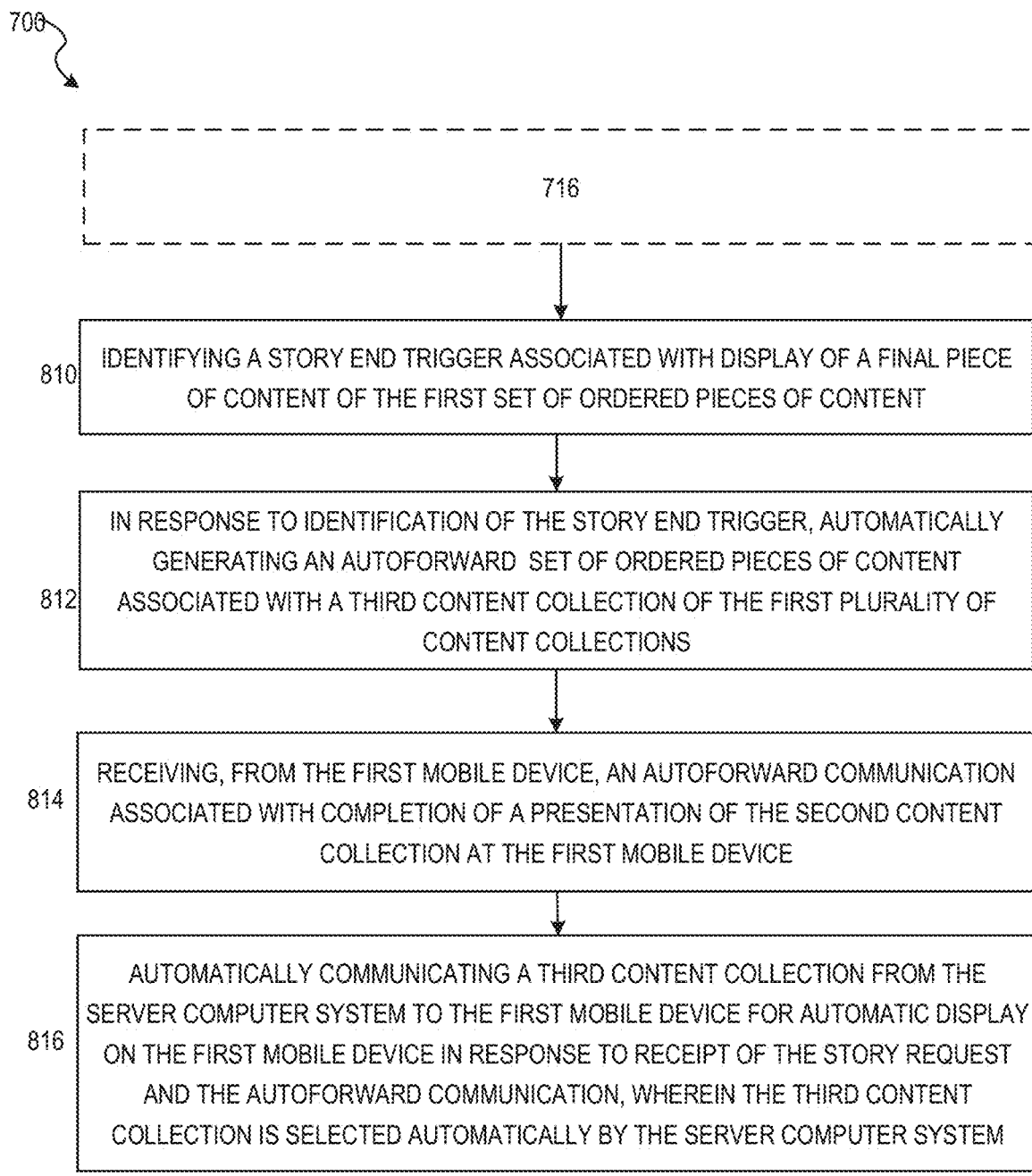
FIG. 8 illustrates additional steps to the method, according to some embodiments, for aggregating content items into a queue based on a user interaction.

FIG. 8 is a flowchart that illustrates a continuation of the method 700, according to some embodiments, for supplementing aggregated content based on a user indication with additional content using an autoforward feature. It will be apparent that certain operations may be repeated or reordered, or other operations may be performed between the described operations, while still functioning in accordance with the user-initiated content aggregation embodiments described herein.

Operation 810 begins after the messages from the first content collection and the second content collection are displayed to the user via the client device 110 in operations 714 and 716. These operations flow into operation 810, where the server identifies a story end trigger after the final piece of content from the final collection is displayed to the user. From operation 810, the method 700 flows to operation 812, where the system automatically generates an autoforward set of ordered pieces of content associated with a third, unselected content collection. For example, if a user selects two semi-private collections for the playlist queue associated with two other users located in Los Angeles, the content collection selection and autoforwarding module 566 may automatically queue a public live collection from Los Angeles. Alternatively, the content collection selection and autoforwarding module 566 may automatically queue a sponsored content collection (e.g., an advertisement) related to the Los Angeles area. In some example embodiments, the content collection selection and autoforwarding module 566 queues an autoforward content collection in between user-initiated collections, such that the user will view the autoforward content collection after a first queued content collection but before a second queued content collection.

From operation 812, the method 700 flows to operations 814 and 816, where the system receives an indication that the final piece of user-initiated queued content from the second content collection has been displayed and automatically causes display of the autoforwarded set of pieces of content from the third content collection. In an example involving an advertisement, the content collection selection and autoforwarding module 566 detects a story end trigger caused by the last piece of content from a final content collection in the user-initiated queue being displayed and automatically causes display of an additional content collection including the advertisement.

Figure 9:
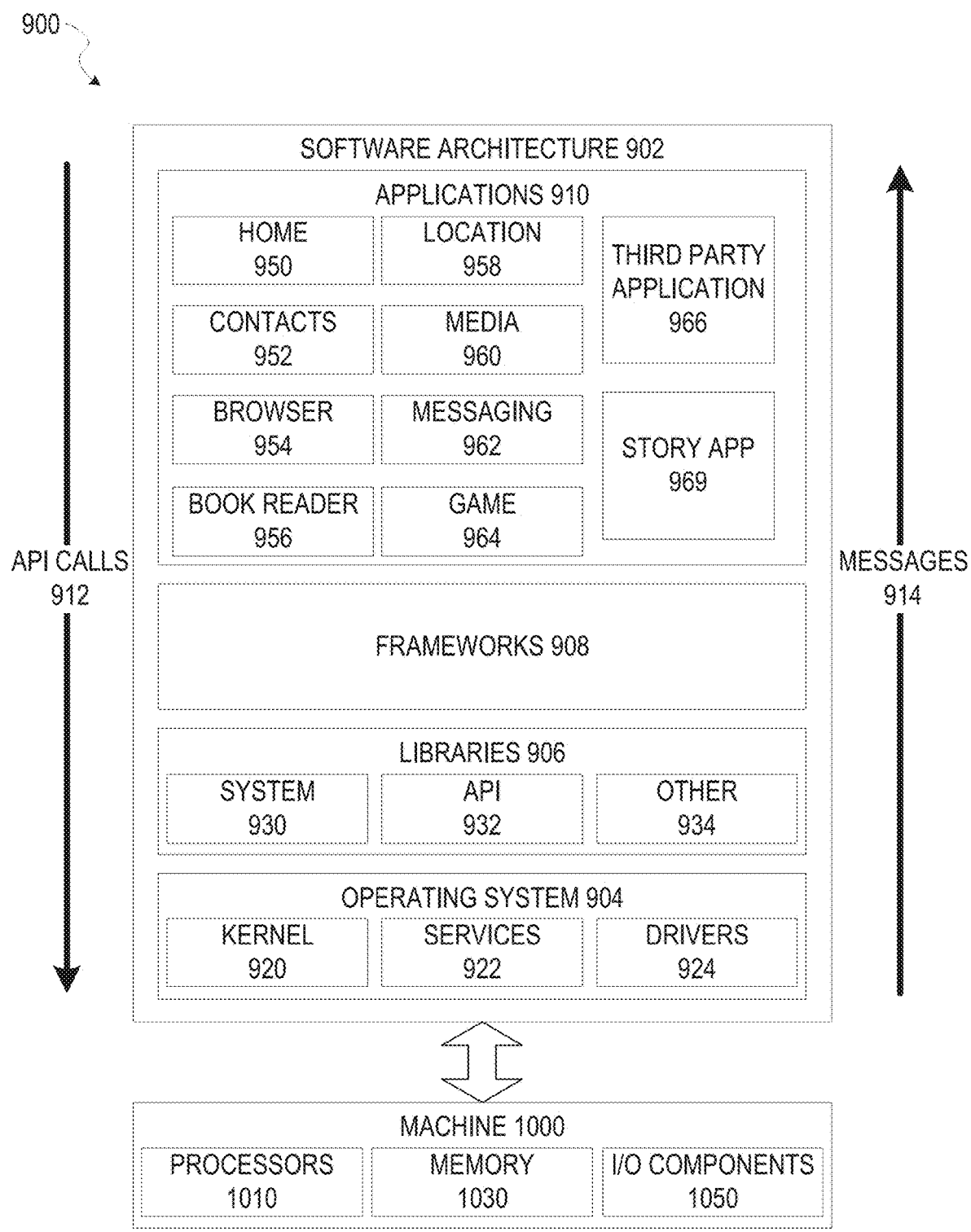
FIG. 9 is a block diagram illustrating an example of a software architecture that may be installed on a machine, according to some example embodiments.

FIG. 9 is a block diagram 900 illustrating an architecture of a software architecture 902, which can be installed on any one or more of the devices described above. For example, in various embodiments, the client devices 110 and 120 and server systems 150, 250, and 550 may be implemented using some or all of the elements of the software 902. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments.

For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and three dimensions (3D) on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include a content collection application 967. In certain embodiments, this may be a standalone application that operates to manage communications with a server system such as the server system 150. In other embodiments, this functionality may be integrated with another application such as the media application 960 or another such application. The content collection application 967 may manage collection of content using a camera device of the machine 1000, communication with the server system 550 via the I/O components 1050, and receipt and storage of received content collections in the memory 1030. Presentation of content and user inputs associated with content may be managed by the content collection application 967 using different frameworks 908, library 906 elements, or operating system 904 elements operating on the machine 1000.

Figure 10:
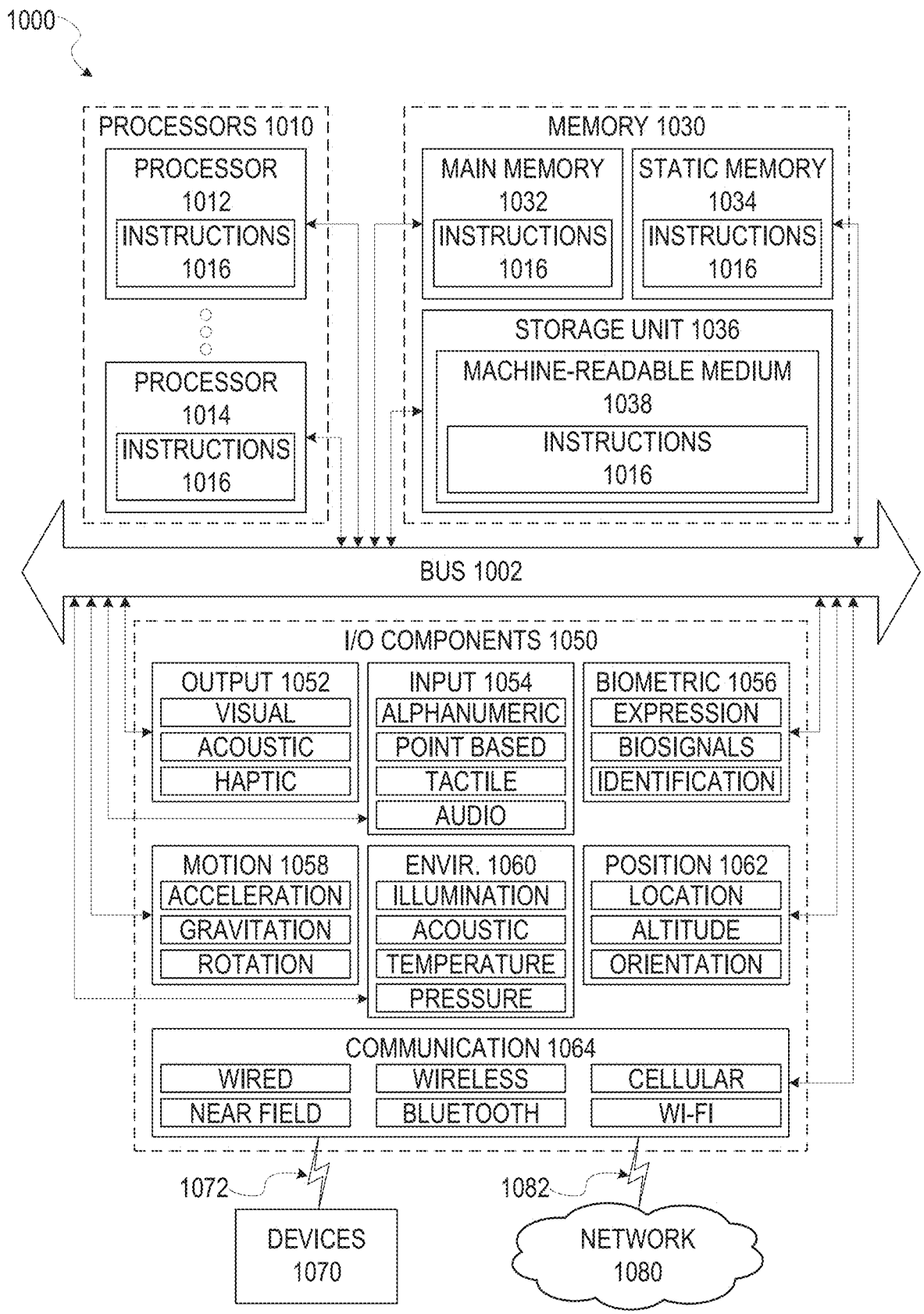
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server system 550 or a client device 110, 120 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute the instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1010, 1012 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a USB).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLU-ETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks. Universal Mobile Telecommunications System (UMTS), High-Speed Packet Access (HSPA), Worldwide Interoperability for Microwave Access (WiMAX), LTE standard, others defined by various standard-setting organizations, other long-range protocols, or other data-transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the machine-readable medium 1038 should be considered as being transportable from one physical location to another. Additionally, since the machine-readable medium 1038 is tangible, the machine-readable medium 1038 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for network communication of image-based content collections, the method comprising:

communicating, from a server computer system to a first mobile device, interface information for each content collection of a first plurality of content collections, the interface information including a first selectable queue request element associated with a first content collection within the first plurality of content collections, a second selectable queue request element associated with a second content collection within the first plurality of content collections, and a queue play element;
receiving, from the first mobile device, a first story queue request associated with the first selectable queue request element within the interface information;
receiving, from the first mobile device, a second story queue request associated with the second selectable queue request element within the interface information;
receiving, from the first mobile device, a playlist request associated with the queue play element within the interface information;
communicating one or more content messages from the first content collection to the first mobile device for display on the first mobile device in response to the playlist request; and
automatically communicating one or more content messages from the second content collection to the first mobile device for automatic display on the first mobile device,
wherein the first content collection comprises a first set of content from a first set of content messages of the plurality of content messages,
wherein the first set of content messages are received from a second mobile device associated with a second user account of the server computer system,
wherein the first mobile device is associated with a first user account of the server computer system,
wherein the first mobile device and the second mobile device are associated with the server computer system, and
wherein the first set of content messages comprises all content messages received at the server computer system from the second mobile device within a story threshold time prior to receipt of the first story queue request at the server computer system.

2. The method of claim 1, wherein the server computer system makes the first content collection selectable for the first user account via the first story queue request based on an association between the first user account and the second user account.

3. The method of claim 1, wherein the story threshold time is 24 hours.

4. The method of claim 1, wherein the first plurality of content collections comprises content collections from a plurality of friend accounts associated with the first mobile device.

5. The method of claim 1, further comprising:
receiving, from the first mobile device, a live autoforward communication associated with completion of an end presentation of a final content message from the second content collection at the first mobile device; and
automatically communicating a first live content collection from the server computer system to the first mobile device for automatic display on the first mobile device in response to receipt of the live autoforward communication.

6. The method of claim 5, further comprising communicating one or more advertising elements for presentation on the first mobile device following presentation of a trigger content collection of the first plurality of content collections or the first live content collection, wherein the trigger content collection is selected from content collections of the first plurality of content collections or the first live content collection based on an advertising threshold.

7. The method of claim 5, further comprising:
receiving, at the server computer system, a second plurality of content messages;
receiving, at the server computer system via a curation tool, selection of live media content from the second plurality of content messages for the first live content collection; and
periodically updating the live media content of the first live content collection using the curation tool.

8. The method of claim 1, further comprising communicating one or more advertising elements for presentation on the first mobile device prior to automatic display of the second content collection.

9. A system comprising:
at least one processor of a machine; and
a memory storing instructions that, when executed by the at least one processor, cause the machine to perform operations comprising:
communicating, from a server computer system comprising the memory and the at least one processor to a first mobile device, interface information for each content collection of a first plurality of content collections, the interface information including a first selectable queue request element associated with a first content collection within the first plurality of content collections, a second selectable queue request element associated with a second content collection within the first plurality of content collections, and a queue play element;
receiving, at the server computer system from the first mobile device, a first story queue request associated with the first selectable queue request element within the interface information;
receiving, at the server computer system from the first mobile device, a second story queue request associated with the second selectable queue request element within the interface information;
receiving, at the server computer system from the first mobile device, a playlist request associated with the queue play element within the interface information;
communicating, by the server computer system, one or more content messages from the first content collection to the first mobile device for display on the first mobile device in response to the playlist request;
automatically communicating, by the server computer system, one or more content messages from the second content collection to the first mobile device for automatic display on the first mobile device;
receiving, from the first mobile device, a live autoforward communication associated with completion of an end presentation of a final content message from the second content collection at the first mobile device; and
automatically communicating a first live content collection from the server computer system to the first mobile device for automatic display on the first mobile device in response to receipt of the live autoforward communication.

10. The system of claim 9, wherein the first content collection comprises a first set of content from a first set of content messages of the plurality of content messages, wherein the first set of content messages are received from a second mobile device associated with a second user account of the server computer system;
wherein the first mobile device is associated with a first user account of the server computer system; and
wherein the first mobile device and the second mobile device are associated with the server computer system.

11. The system of claim 10, wherein the server computer system makes the first content collection selectable for the first user account via the first story queue request based on an association between the first user account and the second user account.

12. The system of claim 10, wherein the first set of content messages comprises all content messages received at the server computer system from the second mobile device within a story threshold time prior to receipt of the first story queue request at the server computer system.

13. The system of claim 12, wherein the story threshold time is 24 hours.

14. The system of claim 9, wherein the first plurality of content collections comprises content collections from a plurality of friend accounts associated with the first mobile device.

15. The system of claim 9, wherein the operations further comprise communicating one or more advertising elements for presentation on the first mobile device prior to automatic display of the second content collection.

16. The system of claim 9, wherein the operations further comprise communicating one or more advertising elements for presentation on the first mobile device following presentation of a trigger content collection of the first plurality of content collections or the first live content collection, wherein the trigger content collection is selected from content collections of the first plurality of content per QS collections or the first live content collection based on an advertising threshold.

17. A non-transitory machine-readable storage medium comprising instructions that, when executed by one or more processors of a machine, cause the machine to perform operations comprising:

communicating, from a server computer system to a first mobile device, interface information for each content collection of a first plurality of content collections, the interface information including a first selectable queue request element associated with a first content collection within the first plurality of content collections, a second selectable queue request element associated with a second content collection within the first plurality of content collections, and a queue play element;

receiving, from the first mobile device, a first story queue request associated with the first selectable queue request element within the interface information;

receiving, from the first mobile device, a second story queue request associated with the second selectable queue request element within the interface information;

receiving, from the first mobile device, a playlist request associated with the queue play element within the interface information;

communicating the one or more content messages from the first content collection to the first mobile device for display on the first mobile device in response to the playlist request;

automatically communicating the one or more content messages from the second content collection to the first mobile device for automatic display on the first mobile device; and communicating one or more advertising elements for presentation on the first mobile device prior to automatic display of the second content collection.

* * * * *